(12) United States Patent
Kim et al.

(10) Patent No.: US 10,104,217 B2
(45) Date of Patent: Oct. 16, 2018

(54) METHOD AND APPARATUS FOR OPERATING ELECTRONIC DEVICE DETACHABLE FROM ANOTHER ELECTRONIC DEVICE

(71) Applicant: Samsung Electronics Co., Ltd., Suwon-si, Gyeonggi-do (KR)

(72) Inventors: Kyungkyu Kim, Suwon-si (KR); Youngjoong Mok, Suwon-si (KR); Sangwook Kwon, Suwon-si (KR); Hyun Jeong Kang, Seoul (KR); Jae-Seung Son, Suwon-si (KR); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 15/234,479

(22) Filed: Aug. 11, 2016

(65) Prior Publication Data

US 2017/0048370 A1    Feb. 16, 2017

(30) Foreign Application Priority Data

Aug. 13, 2015 (KR) .................. 10-2015-0114600

(51) Int. Cl.
*H04B 7/00* (2006.01)
*H04M 1/725* (2006.01)
(Continued)

(52) U.S. Cl.
CPC ........ *H04M 1/7253* (2013.01); *G06F 1/1626* (2013.01); *G06F 1/1656* (2013.01); *G06F 1/1692* (2013.01); *G06F 1/1698* (2013.01); *G06F 1/266* (2013.01); *G06F 3/038* (2013.01); *G06F 3/03545* (2013.01); *G06F 3/03547* (2013.01); *G06F 3/0485* (2013.01); *G06F 3/16* (2013.01); *H04M 1/0256* (2013.01); *H04W 4/80* (2018.02); *G06F 2200/1632* (2013.01); *G06F 2203/0338* (2013.01);
(Continued)

(58) Field of Classification Search
CPC ............ H04M 1/7253; H04M 1/72577; G06F 3/0416; G06F 3/0488; H04W 4/008
USPC ...................... 455/41.1, 41.2, 41.3
See application file for complete search history.

(56) References Cited

U.S. PATENT DOCUMENTS 9,195,351 B1 * 11/2015 Rosenberg ............ G06F 1/1626
9,438,065 B2 * 9/2016 Lee ....................... H02J 7/0042
(Continued)

FOREIGN PATENT DOCUMENTS

EP    2 746 901 A2    6/2014

*Primary Examiner* — Md Talukder
(74) *Attorney, Agent, or Firm* — Jefferson IP Law, LLP

(57) ABSTRACT

An electronic device is provided. The electronic device includes a first electromagnet mounted to a side surface of the electronic device and configured to generate a magnetic force, a data channel terminal configured to transmit and receive a signal for detecting whether another electronic device is attached, and a processor configured to determine at least one of a polarity and a strength of the magnetic force of the first electromagnet for an attachment or detachment between the electronic device and the other electronic device, control the first electromagnet according to at least one of the determined polarity and strength, and detect an attachment or detachment state between the electronic device and the other electronic device.

20 Claims, 29 Drawing Sheets

US 10,104,217 B2
Page 2

(51) Int. Cl.
*H04W 4/80* (2018.01)
*H04M 1/02* (2006.01)
*G06F 3/16* (2006.01)
*G06F 1/16* (2006.01)
*G06F 1/26* (2006.01)
*G06F 3/038* (2013.01)
*G06F 3/0485* (2013.01)
*G06F 3/0354* (2013.01)

(52) U.S. Cl.
CPC . *G06F 2203/0384* (2013.01); *H04M 1/72577* (2013.01); *H04M 2250/22* (2013.01)

(56) References Cited

U.S. PATENT DOCUMENTS

| | | | | |
|---|---|---|---|---|
| 9,483,129 | B1* | 11/2016 | Holsen | G06F 3/03545 |
| 2002/0190823 | A1* | 12/2002 | Yap | G06F 1/1616 |
| | | | | 335/205 |
| 2006/0023922 | A1* | 2/2006 | Black | G06K 9/00154 |
| | | | | 382/115 |
| 2009/0318080 | A1* | 12/2009 | Takagi | H04B 5/0075 |
| | | | | 455/41.1 |
| 2010/0081479 | A1 | 4/2010 | Lee et al. | |
| 2010/0170726 | A1* | 7/2010 | Yeh | G06F 3/03545 |
| | | | | 178/19.03 |
| 2012/0063052 | A1* | 3/2012 | Chen | H01R 13/6205 |
| | | | | 361/144 |
| 2012/0068942 | A1* | 3/2012 | Lauder | H01F 7/04 |
| | | | | 345/173 |
| 2012/0069502 | A1* | 3/2012 | Lauder | H01F 7/04 |
| | | | | 361/679.01 |
| 2012/0284427 | A1* | 11/2012 | Dods | H04W 88/00 |
| | | | | 710/3 |
| 2014/0015783 | A1* | 1/2014 | Jeon | G06F 3/038 |
| | | | | 345/173 |
| 2014/0049894 | A1* | 2/2014 | Rihn | G06F 1/1616 |
| | | | | 361/679.27 |
| 2014/0160045 | A1 | 6/2014 | Park et al. | |
| 2014/0168175 | A1* | 6/2014 | Mercea | G06F 3/046 |
| | | | | 345/179 |
| 2014/0168176 | A1* | 6/2014 | Nowatzyk | G06F 3/03545 |
| | | | | 345/179 |
| 2014/0180481 | A1* | 6/2014 | Park | G06F 3/0487 |
| | | | | 700/275 |
| 2015/0020024 | A1* | 1/2015 | Lee | G06F 3/03545 |
| | | | | 715/800 |
| 2015/0111621 | A1* | 4/2015 | Smith | H04B 1/3888 |
| | | | | 455/575.1 |
| 2015/0156290 | A1* | 6/2015 | Amit | H04M 1/026 |
| | | | | 345/179 |
| 2015/0159989 | A1* | 6/2015 | Kim | G01R 33/072 |
| | | | | 324/207.2 |
| 2016/0054821 | A1* | 2/2016 | Kim | G06F 3/03545 |
| | | | | 345/179 |
| 2016/0284497 | A1* | 9/2016 | Stryker | G06F 1/16 |
| 2017/0048370 | A1* | 2/2017 | Kim | H04M 1/7253 |
| 2017/0241801 | A1* | 8/2017 | Fedtke | G01D 5/12 |

* cited by examiner

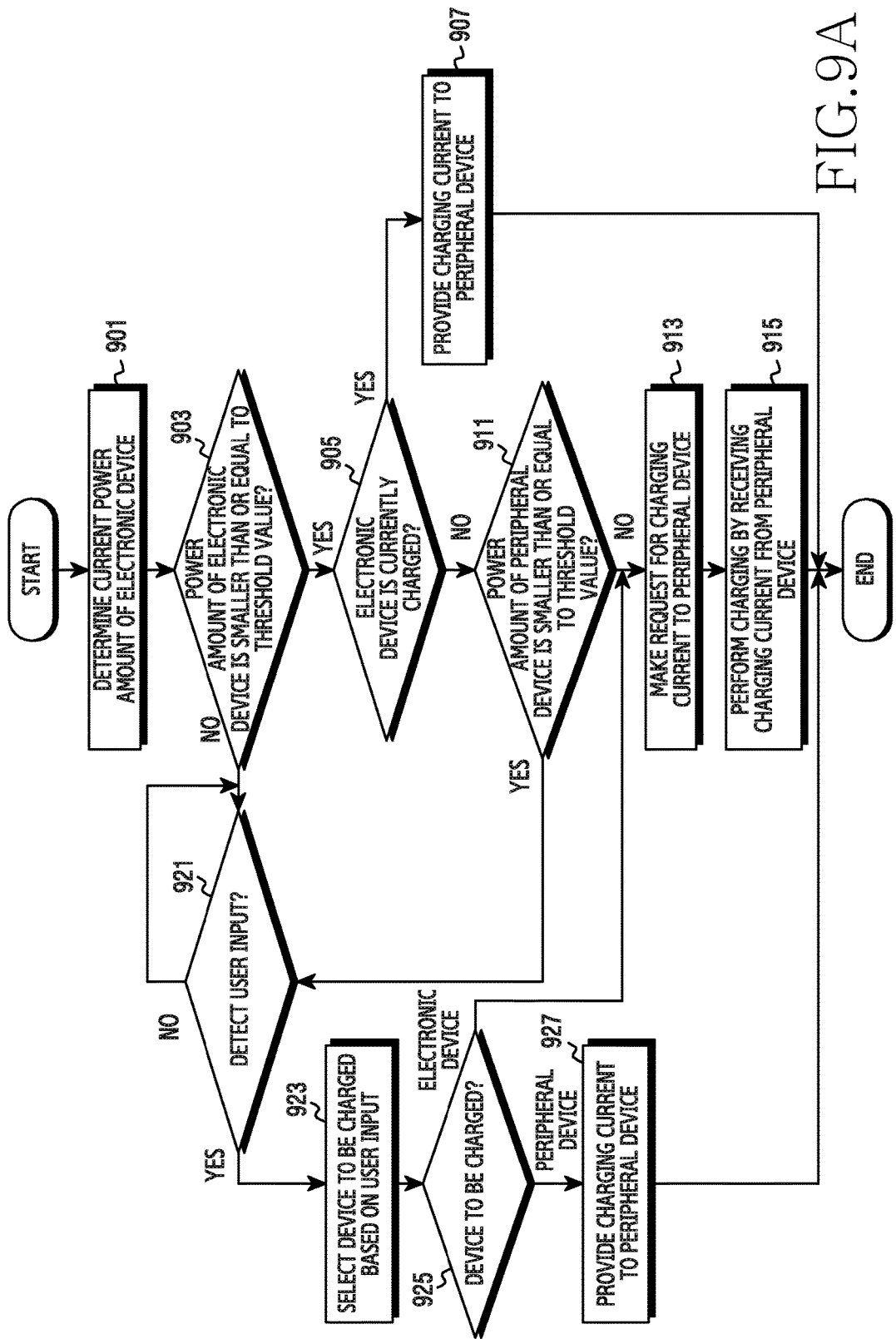

METHOD AND APPARATUS FOR OPERATING ELECTRONIC DEVICE DETACHABLE FROM ANOTHER ELECTRONIC DEVICE

CROSS-REFERENCE TO RELATED APPLICATION(S)

This application claims the benefit under 35 U.S.C. § 119(a) of a Korean patent application filed on Aug. 13, 2015 in the Korean Intellectual Property Office and assigned Serial number 10-2015-0114600, the entire disclosure of which is hereby incorporated by reference.

TECHNICAL FIELD

The present disclosure relates to a method and an apparatus for operating an electronic device detachable from another electronic device.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) system'. The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), full dimensional MEMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G communication system, hybrid frequency shift keying (FSK), Feher's quadrature amplitude modulation (FQAM), and sliding window superposition coding (SWSC), as an advanced coding modulation (ACM), and filter bank multi carrier (FBMC), non-orthogonal multiple access (NOMA), and sparse code multiple access (SCMA) as an advanced access technology, have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Meanwhile, with the rapid development of telecommunications technologies, peripheral devices which can be used while being attached or added to an electronic device have also been developed. For example, peripheral devices may include an auxiliary memory card, an ear microphone installed in an electronic device to make a phone call with a counterpart, a Bluetooth headset for short-range wireless communication by a Bluetooth module installed in an electronic device, and a touch pen for easily controlling a touch screen that simultaneously performs input and output.

An electronic device having a touch screen may have a touch pen of a predetermined length having a sharp tip to be attachable to or detachable from the electronic device in order to increase convenience and variety of the touch. For example, the touch pen may be installed to be attachable to or detachable from a pen mounting hole formed inside the electronic device. However, as described above, when the touch pen is inserted into the electronic device, a thickness of the pen is limited by the size of the electronic device, thereby degrading a feeling of handwriting. Further, in order to use the touch pen inserted into the electronic device, a user should detach the touch pen from the electronic device by applying a force to a pen holder, so that the usability deteriorates. The related arts have provided an independent touch pen to solve these problems, but such an independent pen has a high risk of loss and low portability.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a portable peripheral device which can improve a feeling of handwriting due to having no limitation in thickness by the size of an electronic device and resolve inconvenience of an attachment and/or a detachment to and/or from the electronic device.

Another aspect of the present disclosure is to provide a method and an apparatus for easily attaching/detaching a peripheral device to/from an electronic device.

Another aspect of the present disclosure is to provide an operation method and an apparatus according to an attachment/detachment state of a peripheral device that can be attached/detached to/from an electronic device.

Another aspect of the present disclosure is to provide a method and an apparatus for charging a peripheral device that can be attached/detached to/from an electronic device.

Another aspect of the present disclosure is to provide an operation method and an apparatus according to an attachment/detachment state of an attachable/detachable peripheral device based on an application executed in an electronic device.

In accordance with an aspect of the present disclosure, an electronic device is provided. The electronic device includes a first electromagnet mounted to a side surface of the electronic device and configured to generate a magnetic force, a data channel terminal configured to transmit and receive a signal for detecting whether another electronic device is attached, and a processor configured to determine at least one of a polarity and a strength of the magnetic force of the first electromagnet for an attachment or detachment between the electronic device and the other electronic device, control the first electromagnet according to at least one of the determined polarity and strength, and detect an attachment or detachment state between the electronic device and the other electronic device.

In accordance with another aspect of the present disclosure, an electronic device is provided. The electronic device includes a touch detection display, a detector configured to detect an attachment and a detachment between the electronic device and another electronic device, a communicator configured to communicate with the other electronic device, and a processor configured to control to transmit at least one first content to the other electronic device by a user's gesture in a state where the other electronic device is attached to the electronic device, and to receive at least one second content from the other electronic device by a user's gesture in the state where the other electronic device is attached to the electronic device.

In accordance with another aspect of the present disclosure, an electronic device is provided. The electronic device includes a touch detection display, a detector configured to detect an attachment and a detachment between the electronic device and another electronic device, a power terminal configured to one of provide power to the other electronic device attached to the electronic device and receive power from the other electronic device attached to the electronic device, and a processor configured to one of provide charging power to the other electronic device and receive charging power from the other electronic device based on at least one of a residual power amount of the electronic device and a residual power amount of the other electronic device attached to the electronic device.

In accordance with another aspect of the present disclosure, an electronic device is provided. The electronic device includes a touch detection display, a detector configured to detect an attachment and a detachment between the electronic device and another electronic device, a communicator configured to communicate with the other electronic device, and a processor configured to determine, when a touch for the touch detection display is detected, a touch type based on a capacitive range of the detected touch, and determine an operation to be performed, based on at least one of whether the other electronic device is attached to the electronic device and the determined touch type among a plurality of operations which can be performed in an executed application. The touch type includes at least one of a finger touch type and a touch type by the other electronic device.

In accordance with another aspect of the present disclosure, an electronic device is provided. The electronic device includes a touch detection display, a communicator configured to communicate with another electronic device, and a processor configured to acquire at least one piece of identification information and state information of an executed application, determine an application to be executed in the other electronic device based on whether the other electronic device is attached to the electronic device and the acquired at least one piece of the identification information and the state information of the executed application, and transmit information on the determined application to the other electronic device.

In accordance with another aspect of the present disclosure, an electronic device is provided. The electronic device includes a touch detection display, a detector configured to detect an attachment and a detachment between the electronic device and another electronic device, a communicator configured to communicate with the other electronic device, and a processor configured to control to acquire at least one piece of identification information and state information of an application executed in the other electronic device from the other electronic device, determine an application to be executed in the electronic device based on whether the other electronic device is attached to the electronic device and the acquired at least one piece of the identification information and the state information of the application executed in the other electronic device, and execute the determined application.

In accordance with another aspect of the present disclosure, an electronic device is provided. The electronic device includes a touch detection display, a detector configured to detect an attachment and a detachment between the electronic device and another electronic device, a communicator configured to communicate with the other electronic device, and a processor configured to control to determine whether the other electronic device is attached to the electronic device when an incoming message for a first application is received, inform of reception of the incoming message by the electronic device when the other electronic device is attached, and transmit the incoming message to the other electronic device when the other electronic device is not attached.

In accordance with another aspect of the present disclosure, an electronic device is provided. The electronic device includes a touch detection display, a detector configured to detect an attachment and a detachment between the electronic device and another electronic device, a communicator configured to communicate with the other electronic device, and a processor configured to control to receive an incoming message for a first application from the other electronic device, display the received incoming message, detect a reply writing event based on a touch for the touch detection display and a press of at least one key button, recognize written data based on a motion of the electronic device, generate a reply message for the first application including the recognized written data, and transmit the generated reply message for the first application to the electronic device.

In accordance with another aspect of the present disclosure, a method of an electronic device is provided. The method includes determining at least one of a polarity and a strength for a magnetic force of a first electromagnet included in the electronic device for one of an attachment and a detachment between the electronic device and another electronic device, controlling the magnetic force of the first electromagnet according to at least one of the determined polarity and strength, and transmitting a signal for detecting one of an attachment and a detachment state between the electronic device and the other electronic device.

In accordance with another aspect of the present disclosure, a method of an electronic device is provided. The method includes detecting whether the electronic device and another electronic device are in an attached state with each other, and one of transmitting at least one content to the other electronic device and receiving at least one content from the other electronic device by a user's gesture, when the electronic device and the other electronic device are detected to be in the attached state.

In accordance with another aspect of the present disclosure, a method of an electronic device is provided. The method includes detecting whether the electronic device and another electronic device are in an attached state with each other, determining a device to receive a charging power between the electronic device and the other electronic device based on at least one of a residual power amount of the electronic device, a residual power amount of the other electronic device attached to the electronic device, and a user's gesture, when the electronic device and the other electronic device are in the attached state, and one of providing the charging power to the other electronic device and receiving the charging power from the other electronic device, according to the determined device.

In accordance with another aspect of the present disclosure, a method of an electronic device is provided. The method includes determining, when a touch for a touch detection display is detected, a touch type based on a capacitive range of the detected touch, detecting whether another electronic device is attached to the electronic device, and determining an operation to be performed based on at least one of whether the other electronic device is attached to the electronic device and the determined touch type among a plurality of operations which can be performed in an executed application. The touch type includes at least one of a finger touch type and a touch type by the other electronic device.

In accordance with another aspect of the present disclosure, a method of an electronic device is provided. The method includes acquiring at least one of identification information and state information of an executed application, determining an application to be executed in another electronic device based on whether the other electronic device is attached to the electronic device and the acquired at least one of the identification information and the state information of the executed application, and transmitting information on the determined application to the other electronic device.

In accordance with another aspect of the present disclosure, a method of an electronic device is provided. The method includes acquiring at least one of identification information and state information of a first application executed in another electronic device from the other electronic device, determining a second application to be executed in the electronic device based on whether the other electronic device is attached to the electronic device and the acquired at least one of the identification information and the state information of the first application executed in the other electronic device, and executing the determined second application.

In accordance with another aspect of the present disclosure, a method of an electronic device is provided. The method includes determining, when a first incoming message for a first application is received, whether another electronic device is attached to the electronic device, displaying, when the other electronic device is attached, the first incoming message in the electronic device, and transmitting, when the other electronic device is not attached, a second incoming message to the other electronic device.

In accordance with another aspect of the present disclosure, a method of an electronic device is provided. The method includes receiving an incoming message for a first application from another electronic device, displaying the received incoming message, detecting a reply writing event based on one of a touch for a touch detection display and a press of at least one key button, recognizing written data based on a motion of the electronic device, generating a reply message for the first application including the recognized written data, and transmitting the generated reply message for the first application to the other electronic device.

According to embodiments of the present disclosure, it is possible to perform various functions according to an attachment/detachment state by using a peripheral device which can be attached/detached to/from an electronic device and to improve usability through an intuitive interface.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9A illustrates a charging process of an electronic device and a peripheral device according to an embodiment of the present disclosure;

Throughout the drawings, like reference numerals will be understood to refer to like parts, components, and structures.

DETAILED DESCRIPTION

Figure 1:
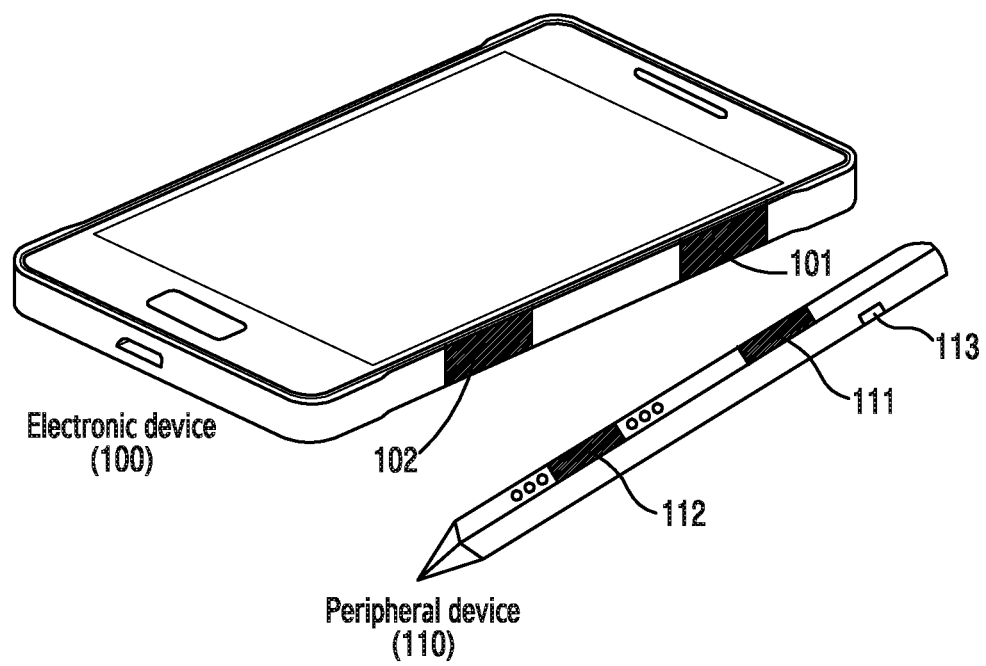
FIG. 1 illustrates a structure for an attachment/detachment of a peripheral device to/from an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the an will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure may have various modifications and various embodiments, among which specific embodiments will now be described more fully with reference to the accompanying drawings. However, it should be understood that the present disclosure is not limited to the specific embodiments, but the present disclosure includes all modifications, equivalents, and alternatives within the spirit and the scope of the present disclosure. Accordingly, in this patent specification, FIGS. 1, 2A, 2B, 2C, 3, 4, 5A, 5B, 5C, 6A, 6B, 6C, 7A, 7B, 8, 9A, 9B and 10 used for describing the principles of the present disclosure are merely for examples and should not be construed to limit the scope of the present disclosure.

An electronic device and/or a peripheral device according to various embodiments of the present disclosure may be a device including a communication function. For example, the electronic device and/or a peripheral device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to various embodiments, the electronic device and/or a peripheral device may be a smart home appliance with a communication function. The smart home appliances may include at least one of, for example, televisions (TVs), digital versatile disc (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to various embodiments, the electronic device and/or a peripheral device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to various embodiments, the electronic device and/or a peripheral device may include at least one of furniture or a part of a building/structure, an electronic board, an electronic signature receiving device, a projector, and various types of measuring devices (for example, a water meter, an electric meter, a gas meter, a radio wave meter and the like) including a camera function. The electronic device and/or a peripheral device according to various embodiments of the present disclosure may be a combination of one or more of the above described various devices. Also, an electronic device and/or a peripheral device according to various embodiments of the present disclosure may be a flexible device. Also, it will be apparent to hose skilled in the art that an electronic device and/or a peripheral device according to various embodiments of the present disclosure is not limited to the above described devices.

Hereinafter, it is assumed that an electronic device corresponds to a mobile communication electronic device such as a smart phone, a tablet PC, and/or a mobile phone, and a peripheral device corresponds to an electronic pen. However, the following description may be applied, in the same way, to a case where the electronic device and the peripheral device correspond to different devices.

FIG. 1 illustrates a structure for attachment/detachment of a peripheral device to/from an electronic device according to an embodiment of the present disclosure.

Referring to FIG. 1, an electronic device 100 according to an embodiment of the present disclosure may include a plurality of electro permanent magnet (EPM) modules 101 and 102 on the side surface and may generate a magnetic force for attachment and/or detachment of a peripheral device 110. For example, the electronic device 100 may generate a magnetic force of a first polarity through the EPM modules 101 and 102 located on the side surface of the electronic device 100 in order to attach the peripheral device 110 to the electronic device 100. In another example, the electronic device 100 may generate a magnetic force of a second polarity through the EPM modules 101 and 102 located on the side surface of the electronic device 100 in order to detach the peripheral device 110 from the electronic device 100.

Further, the peripheral device 110 according to an embodiment of the present disclosure may include a plurality of EPM modules 111 and 112 on the side surface and may generate a magnetic force for attachment and/or detachment to and/or from the electronic device 100. For example, the peripheral device 110 may generate a magnetic force of a second polarity through the EPM modules 111 and 112 located on the side surface of the peripheral device 110 for the attachment to the electronic device 100. Further, the peripheral device 110 may generate a magnetic force of a first polarity through the EPM modules 111 and 112 located on the side surface of the peripheral device 110 for the detachment from the electronic device 100.

According to an embodiment of the present disclosure, each of the electronic device 100 and the peripheral device 110 may generate a magnetic force of a polarity opposite to the polarity generated by the EPM module of the counterpart device for the attachment to the counterpart device and generate a magnetic force of the same polarity as the polarity generated by the EPM module of the counterpart device for the detachment from the counterpart device. Further, each of the electronic device 100 and the peripheral device 110 may control the magnetic force generated by the EPM module to be equal to or smaller than a threshold value for the detachment from the counterpart device. For example, for a detachment from a counterpart device, each of the electronic device 100 and the peripheral device 110 may generate only an amount of magnetic force so that a user can separate, by pulling, the peripheral device 110 from the electronic device 100. Accordingly, the threshold value may be set and changed based on a size of user power.

The EPM modules included in each of the electronic device 100 and the peripheral device 110 may include an EPM, a data channel terminal, a power terminal, and a ground terminal. The EPM may change a polarity of a magnetic force or control a strength of a magnetic force under a control of the corresponding device. For example, the electronic device 100 may enhance magnetism of the EPM by applying a pulse of voltage to attach the peripheral device 110 with a strong force. In another example, the electronic device 100 may weaken magnetism of the EPM by applying an opposite voltage for the detachment from the peripheral device 110. The EPM may generate a magnetic force so that the user may not separate, by pulling, the peripheral device 110 from the electronic device 100. The data channel terminal refers to a terminal for transmitting and receiving data to and from the counterpart device. Further, the power terminal refers to a terminal for transmitting power (or charging current) to the counterpart device or receiving power (or charging current) from the counterpart device.

In addition, the electronic device 100 and the peripheral device 110 according to an embodiment of the present disclosure may exchange polarity information for the attachment and/or detachment. For example, the electronic device 100 and the peripheral device 110 may exchange polarity information for attachment and/or detachment through a data channel of the EPM module.

Additionally, the peripheral device 110 according to an embodiment of the present disclosure may include at least one key button 113 for controlling attachment/detachment in order to easily perform the attachment to the electronic device 100 and/or the detachment from the electronic device 100. For example, when a press of the at least one key button 113 for controlling the attachment/detachment is detected in a state where the peripheral device 110 is attached to the electronic device 100, the peripheral device 110 may detect a generation of a detachment event and control a strength of a polarity and/or a magnetic force of the EPM module to be detached from the electronic device 100. In another example, when a press of the at least one key button 113 for controlling the attachment/detachment is detected in a state where the peripheral device 110 is detached from the electronic device 100, the peripheral device 110 may detect a generation of an attachment event and control a strength of a polarity and/or a magnetic force of the EPM module to be attached to the electronic device 100.

Although FIG. 1 illustrates that each of the electronic device 100 and the peripheral device 110 includes two EPM modules, it is only an example, and embodiments of the present disclosure may be equally applied to a case where each of the electronic device 100 and the peripheral device 110 includes at least one EPM module.

Additionally, the peripheral device 110 includes a display. Accordingly, when the peripheral device 110 detects the attachment to the electronic device 100, the electronic device 100 may perform an additional display through the display of the peripheral device. For example, the electronic device 100 may split one image into a first sub image and a second sub image in consideration of a screen size of the display of the electronic device 100 and a screen size of the display of the peripheral device 110, and then control the electronic device 100 to display the first sub image and the peripheral device 110 to display the second sub image. In another example, the electronic device 100 may control the electronic device 100 to display a first image and the peripheral device 110 to display another image related to a main image, another image irrelevant to the main image, or an image designated by a user. Further, when the peripheral device 110 detects the detachment from the electronic device 100, the peripheral device 110 may perform an independent function or a function related to the operation of the electronic device 100.

In addition, when the peripheral device 110 is attached to the electronic device 100, when the peripheral device 110 is detached from the electronic device 100, when a press of a predetermined key button located at the peripheral device 110 is detected, or when a particular event such as reception of a signal from the electronic device 100 is generated, the display may be activated.

Figure 2A:
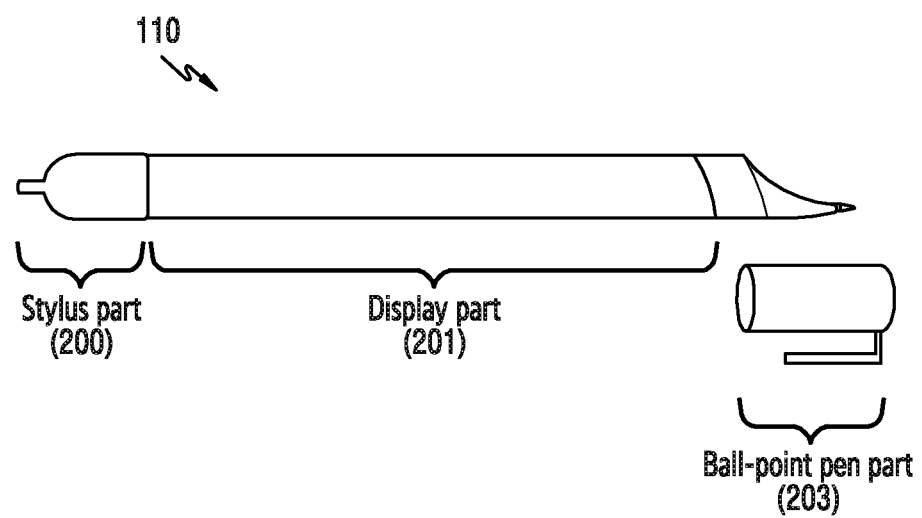
FIGS. 2A to 2C illustrate a structure of a peripheral device according to an embodiment of the present disclosure.
Figure 2B:
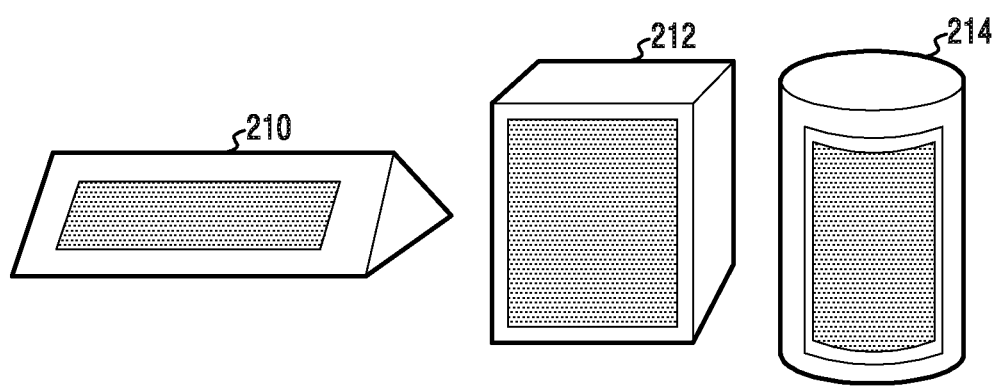
Figure 2C:
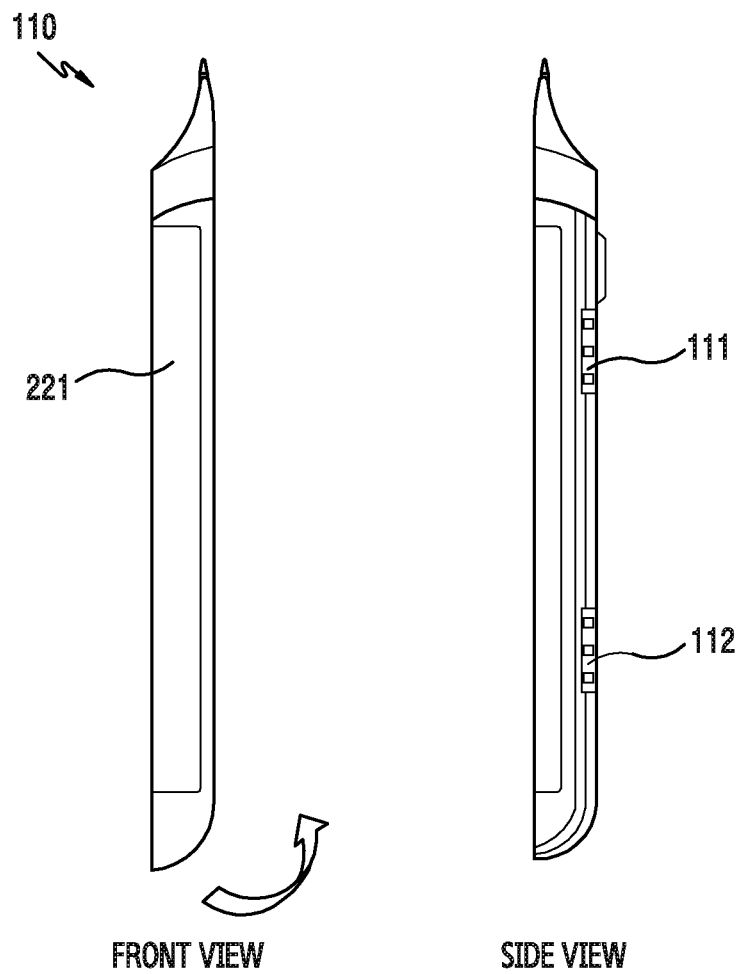

FIGS. 2A to 2C illustrate a structure of the peripheral device according to an embodiment of the present disclosure.

Referring to FIG. 2A, the peripheral device 110 may include at least one of a stylus part 200, a display part 201, and a ball-point pen part 203. The stylus part 200 refers to a part which applies a pressure to a touch screen of the electronic device 100. For example, the stylus part 200 refers to a part designed to make a capacitive input or a resistive input onto the touch screen of the electronic device 100 possible. Further, the display part 201 may include a display panel and further include a touch panel. The ball-point pen part 203 may be configured to be like an end of the ball-point pen which can generally write on paper and may include a cover that covers the end part.

Referring to FIG. 2B, the peripheral device 110 may be configured in various forms such as a triangular prism 210, a square pillar 212, or a cylinder 214. For example, the illustrated triangular prism, square pillar, and cylinder are only examples, and the peripheral device 110 may be configured in various forms. The peripheral device 110 may be configured to include a display on at least one side surface.

Referring to FIG. 2C, the peripheral device 110 may include at least one EPM module 111 and 112 for attachment and detachment to and from the electronic device 100 on one side surface. Further, the peripheral device 110 may include a display 221 on the other side surface.

Figure 3:
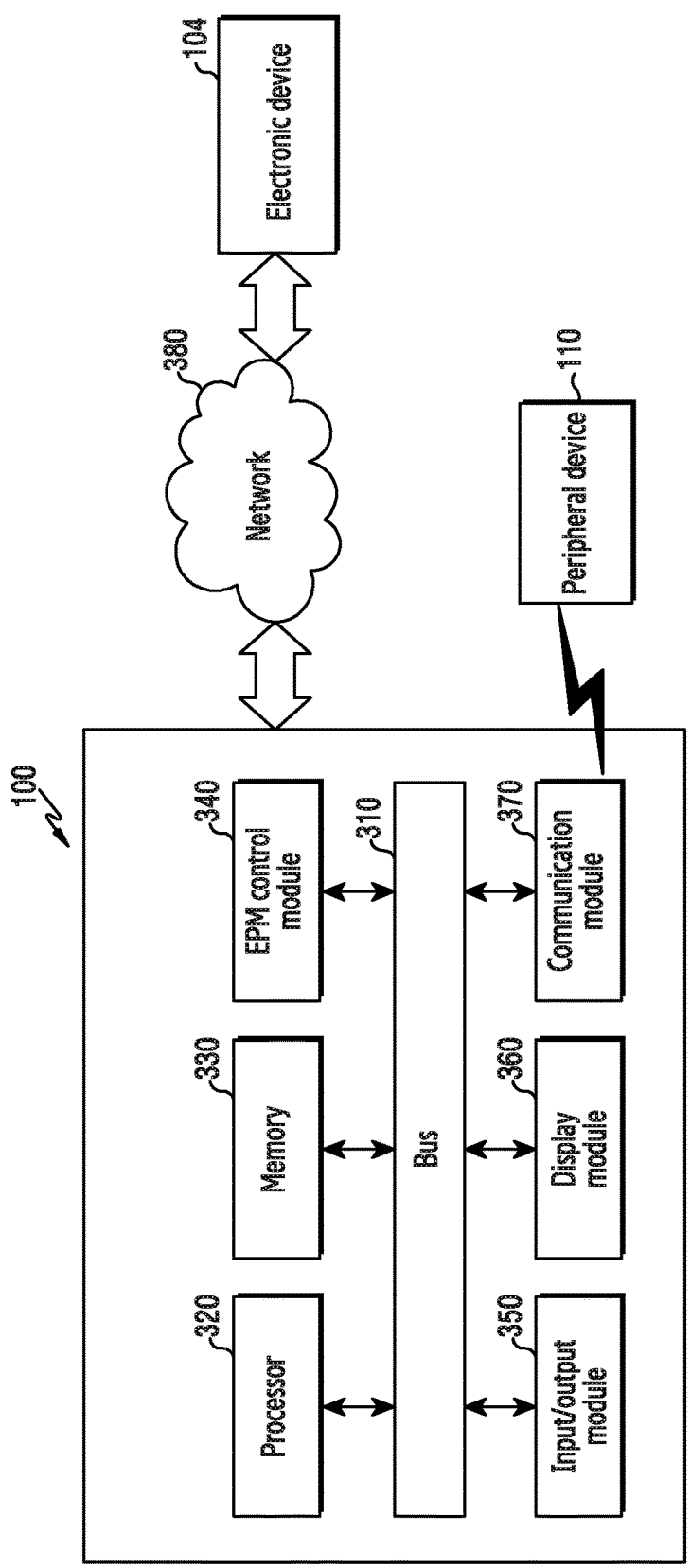
FIG. 3 is a block diagram of an electronic device according to an embodiment of the present disclosure.

FIG. 3 is a block diagram of the electronic device according to an embodiment of the present disclosure.

Referring to FIG. 3, the electronic device 100 may include a bus 310, a processor 320, a memory 330, an EPM control module 340, an input/output module (e.g., interface) 350, a display module 360, and a communication module 370.

The bus 310 may perform a function for connecting the elements included in the electronic device 100 and transferring communication between the elements.

The processor 320 may control various functions related to the operation of the electronic device 100. For example, the processor 320 may analyze an instruction received from at least one other element included in the electronic device 100 through the bus 310 and execute calculations or data processing according to the analyzed instruction. Further, the processor 320 may control a function for providing various services by executing one or more programs stored in the memory 330. For example, the processor 320 may control the operation of at least one of the electronic device 100 and the peripheral device 110 by executing at least one program related to the operation of the peripheral device 110 among programs stored in the memory 330.

According to various embodiments, the processor 320 may detect an event for detachment and/or attachment of the electronic device 100 and the peripheral device 110, and perform a function of generating a magnetic force that generates a particular polarity through the EPM control module 340 or controlling a strength of the magnetic force according to the detected event. For example, the processor 320 may detect the generation of the event for the detachment and/or attachment of the electronic device 100 and the peripheral device 110 by at least one key button located at the electronic device 100, a user input through the touch screen, or a signal input from the peripheral device 110. When the generation of the event for the detachment and/or attachment of the electronic device 100 and the peripheral device 110 is detected, the processor 320 may amplify or attenuate the magnetic force of the EPM included in the EPM module as illustrated in FIG. 5C. Further, the processor 320 may change or maintain the polarity of the EPM included in the electronic device 100 in consideration of at least one of the polarity of the magnetic force that is generated by the current EPM and the polarity of the magnetic force that is generated by the EPM of the peripheral device 110. At this time, the processor 320 may transfer polarity information for the detachment and/or attachment to the peripheral device 110.

According to various embodiments, when an event for the detachment and/or attachment of the electronic device 100 and the peripheral device 110 is detected, the processor 320 may perform a user authentication process. When a user authentication process is successfully completed, the processor 320 may perform a function of generating the magnetic force that generates a particular polarity through the EPM control module 340 or controlling a strength of the magnetic force according to the detected event. For example, when the event for the detachment and/or attachment of the electronic device 100 and the peripheral device 110 is detected, the processor 320 may provide an interface that makes a request for a fingerprint input and perform the user authentication process through recognition of the user's fingerprint. Here, a user authentication scheme using the user's fingerprint may be performed according to various known schemes.

Figure 9B:
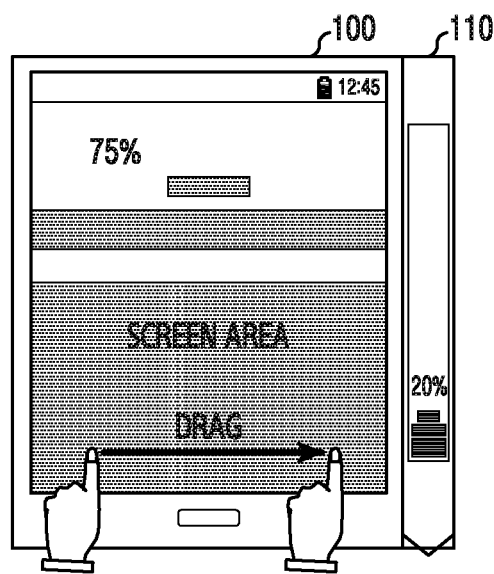
FIG. 9B illustrates an example of a charging scheme of an electronic device and a peripheral device according to an embodiment of the present disclosure.

According to various embodiments, when the peripheral device 110 is attached to the electronic device 100, the processor 320 may perform a charging function of at least one of the electronic device 100 and the peripheral device 110 based on a residual power amount of the electronic device 100 and a residual power amount of the peripheral device 110. For example, when the peripheral device 110 is attached to the electronic device 100 and the residual power amount of the electronic device 100 is smaller than a first threshold and the residual power amount of the peripheral device 110 is larger than or equal to a second threshold, the processor 320 may make a request for providing charging power to the peripheral device 110. Accordingly, the processor 320 may receive a charging current from the peripheral device 110 and perform a charging function. Here, the first threshold and the second threshold may be the same as each other or may be different from each other. Further, when the peripheral device 110 is attached to the electronic device 100, the processor 320 may determine a device to receive charging power by a user gesture and perform a function for charging the determined device. For example, when the peripheral device 110 is attached to the electronic device 100 and a drag in a direction of the attachment of the peripheral device 110 is detected in a predetermined area of the touch screen, as illustrated in FIG. 9B, the processor 320 may determine to charge the peripheral device 110 and perform a function for providing the charging current to the peripheral device 110. In another example, although not illustrated, when the peripheral device 110 is attached to the electronic device 100 and a drag in a direction opposite to the direction of the attachment of the peripheral device 110 is detected in a predetermined area of the touch screen, the processor 320 may determine to charge the electronic device 100 and make a request for providing charging power to the peripheral device 110. When the charging current from the peripheral device 110 is detected, the processor 320 may perform a function for charging a battery of the electronic device 100. Here, the electronic device 100 may provide the charging current to the peripheral device 110 or receive the charging current from the peripheral device 110 through a power terminal included in the EPM module. In the above described example, the processor 320 determines the device to receive the charging power based on the drag direction, but may determine the device to receive the charging power based on another touch action or another gesture.

Figure 11A:
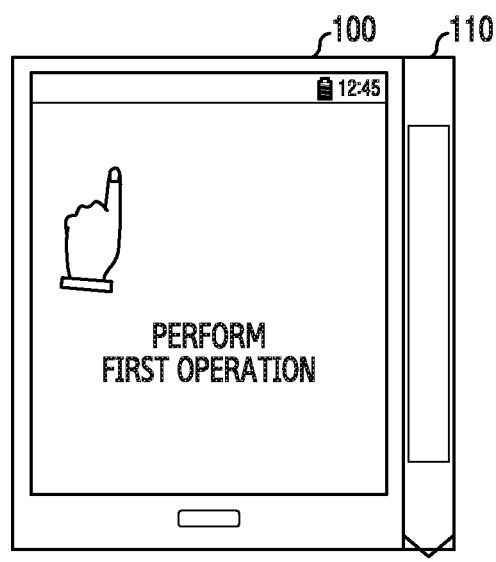
FIGS. 11A to 11C illustrate an example of an operation corresponding to a touch based on an attachment/detachment state between an electronic device and a peripheral device according to an embodiment of the present disclosure.
Figure 11B:
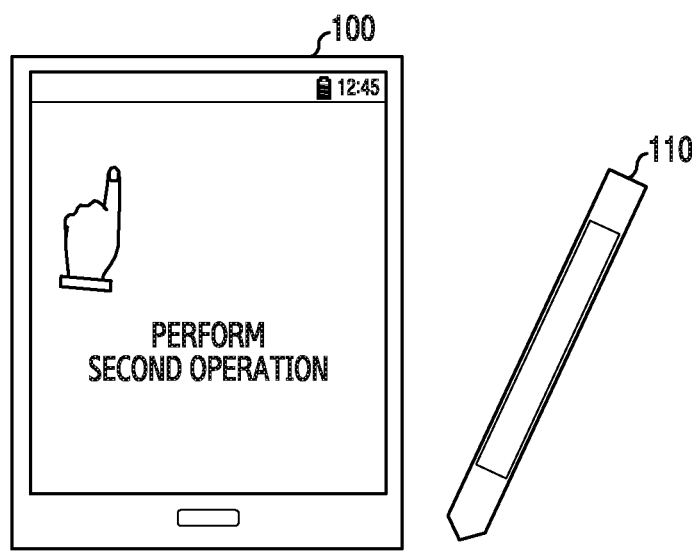
Figure 11C:
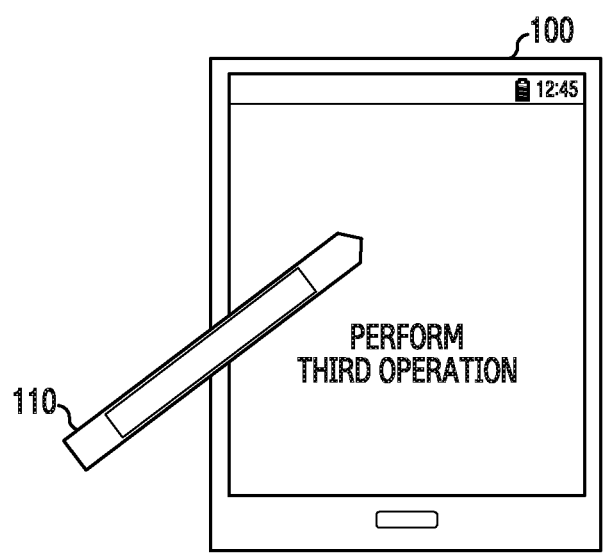

According to various embodiments, when a user input is generated, the processor 320 may determine an operation corresponding to the user input based on attachment/detachment states of the electronic device 100 and the peripheral device 110, the type of application being executed, and an input type. For example, when the user input through the touch screen is detected, the processor 320 may determine an operation to be executed in accordance with a touch based on at least one of whether the peripheral device 110 is attached to or detached from the electronic device 100, the type of application being executed, and a touch input type. For example, when the peripheral device 110 is attached to the electronic device 100 and a touch input is detected in a state where a first application is executed, as illustrated in FIG. 11A, the processor 320 may perform a first operation provided by the first application according to the touch input. In another example, when the peripheral device 110 is not attached to the electronic device 100 and a touch input by a user's finger is detected in a state where the first application is executed, as illustrated in FIG. 11B, the processor 320 may perform a second operation provided by the first application according to the touch input. In another example, when the peripheral device 110 is not attached to the electronic device 100 and a touch input by the peripheral device 110 is detected in a state where the first application is executed, as illustrated in FIG. 11C, the processor 320 may perform a third operation provided by the first application according to the touch input. Herein, the touch type that indicates whether the touch input is by the user's finger or the touch input by the peripheral device 110 may be determined through a measurement of a constant voltage. Here, although the processor 320 performs different operations in cases illustrated in FIGS. 11A and 11C, the same operation may be performed in the cases illustrated in FIGS. 11A and 11C according to a design scheme. For example, when the first application is a memo application, the first operation may be a pen function that performs a memo according to a touch input, the second operation may be an eraser function that deletes a memo according to a touch input, and the third operation may be a function of moving a screen according to a touch movement direction. In another example, when the first application is a web browser, the first operation may be a function of moving a screen according to a touch movement direction, the second operation may be a function of enlarging or reducing a screen according to a touch movement distance, and the third operation may be a function of moving a screen according to a touch movement direction. As illustrated in FIGS. 11B and 11C, the processor 320 may perform different operations according to the touch input type in the state where the peripheral device 110 is not attached, thereby allowing the user to freely use the corresponding application through a finger or a pen.

According to various embodiments, the processor 320 may transmit information on an execution application to the peripheral device 110. For example, the processor 320 may transmit identification information of the execution application and state information of the execution application to the peripheral device 110. The processor 320 may transmit the identification information of the execution application and the state information of the execution application to the peripheral device 110 by using a data channel of the EPM module and a short-range wireless communication module.

According to various embodiments, when the message of a particular application is received from another electronic device 104, the processor 320 may process the received message based on the attachment or detachment between the electronic device 100 and the peripheral device 110. For example, when the message of the particular application is received from the other electronic device 104 and the peripheral device 110 is attached to the electronic device 100, the processor 320 may inform of the reception of the message of the particular application through the display screen of the electronic device 100. In another example, when the message of the particular application is received from the other electronic device 104 and the peripheral device 110 is not attached to the electronic device 100, the processor 320 may transmit the received message of the particular application to the peripheral device 110. When the received message of the particular application is transmitted to the peripheral device 110, the processor 320 may transmit both identification information of the particular application and identification information of the other electronic device. Further, the processor 320 may perform a function of receiving a reply message of the particular application from the peripheral device 110 and transmitting the received reply message to the other electronic device 104 through the particular application. The processor 320 may receive both the identification information of the particular application and the identification information of the other electronic device from the peripheral device 110 and identify the application and counterpart electronic device corresponding to the received reply message.

The memory 330 may store instructions or data received from at least one element included in the electronic device 100 or generated by at least one element. For example, the memory 330 may store at least one application program and store at least one program related to the peripheral device 110. Further, the memory 330 may store user authentication information for the attachment to and detachment from the peripheral device 110.

The memory 330 may include programming modules, such as a kernel, middleware, an application programming interface (API), and applications. Each program module may be configured by at least one of software, firmware, and hardware.

The EPM control module 340 may include at least one EPM module as illustrated in FIG. 1. The EPM module may include an EPM, a data channel terminal, a power terminal, and a ground terminal. The EPM control module 340 may perform a control function for changing a polarity of a magnetic force of the EPM included in the EPM module or controlling a strength of the magnetic force. Further, the EPM control module 340 may perform a function of providing a signal to the peripheral device 110 or receiving a signal from the peripheral device 110 through the data channel terminal included in the EPM module. Further, the EPM control module 340 may perform a function of transferring residual power of the battery of the electronic device 100 to the peripheral device 110 through the power terminal included in the EPM module or transferring power or charging current) from the peripheral device 110 to the battery of the electronic device 100 through the power terminal included in the EPM module. In addition, the EPM control module 340 may transfer power supplied from an external charger to the peripheral device 110 through the power terminal included in at least one EPM module.

The input/output module 350 may transfer an instruction or data generated by a user's election or gesture to the processor 320 or the memory 330 through the bus 310. Further, the input/output module 350 may receive an instruction or data generated by a control of the processor 320 or data stored in the memory 330 through the bus 310 and provide the received data to the user. The input/output module 350 may include at least one of a physical key button, a physical keypad, a touch detection sensor, a proximity sensor, an acceleration sensor, a microphone, a mouse, and a speaker. The input/output module 350 may detect a user's touch on the display module 360 and transfer a result of the detected touch to the processor 320. Further, the input/output module 350 may convert a digital voice signal generated by an executed application into an analog signal and provide the converted analog signal to the user under a control of the processor 320. Additionally, the input/output module 350 may include a charging module that receives power from an external charger connected through a wire or wirelessly and provides the power to a battery (not shown).

The display module 360 may display a video, an image, or data to the user. The display module 360 according to an embodiment of the present disclosure may display information indicating whether the peripheral device 110 is attached to the display of the electronic device 100. Further, the display module 360 may display graphics that make a request for a user authentication for the attachment or detachment of the peripheral device 110 to or from the display of the electronic device 100. The display module 360 may display graphics indicating that a link operation with the peripheral device 110 is being performed. For example, the display module 360 may display graphics indicating that charging power is being provided to the peripheral device 110 or display graphics indicating that charging power is being received from the peripheral device 110. The display module 360 may display various graphics according to the operation of the processor 320.

The communication module 370 may connect communication between the electronic device 100 and an external device (for example, the other electronic device 104, the peripheral device 110, or a server (not shown)). For example, the communication module 370 may be connected to a network 380 through wireless or wired communication and may communicate with the external device. The wireless communication may include at least one of, for example, Wi-Fi, Bluetooth (BT), Bluetooth low energy (BLE), near field communication (NFC), a global positioning system (GPS), and cellular communication (for example, long term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like). Also, the wired communication may include at least one of, for example, a universal serial bus (USB), a high definition multimedia interface (HDMI), recommended standard 232 (RS-232), and a plain old telephone service (POTS). According to various embodiments, the communication module 370 may communicate with the peripheral device 110 by using BLE.

Although not illustrated in FIG. 3, the electronic device 100 may further include at least one other element for executing various applications. For example, the electronic device 100 may further include a camera module or a GPS module for executing a camera application or a location tracking application, respectively.

Figure 4:
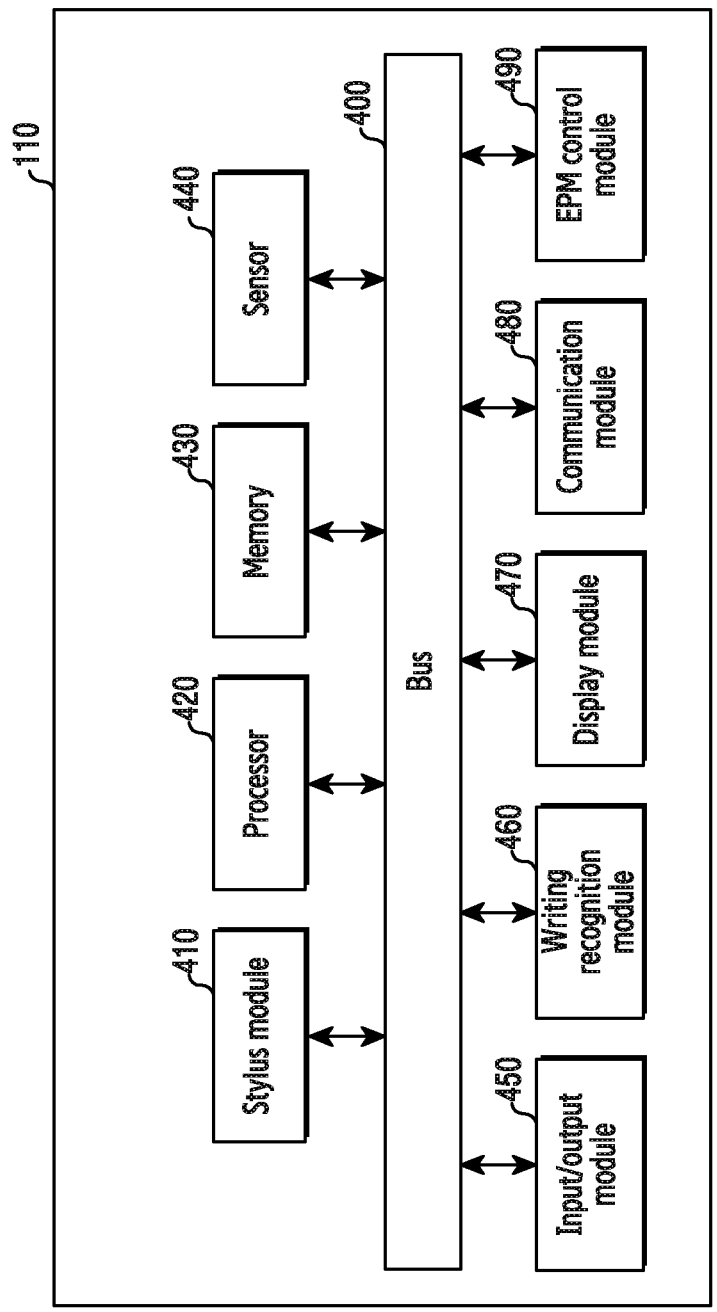
FIG. 4 is a block diagram illustrating a peripheral device according to an embodiment of the present disclosure.

FIG. 4 is a block diagram illustrating the peripheral device according to an embodiment of the present disclosure.

Referring to FIG. 4, the peripheral device 110 may include a bus 400, a stylus module 410, a processor 420, a memory 430, a sensor 440, an input/output module (e.g., interface) 450, a writing recognition module 460, a display module 470, a communication module 480, and an EPM control module 490.

The bus 400 may connect the elements included in the peripheral device 110 and perform a function of transferring communication between the elements.

The stylus module 410 includes at least one element for applying a pressure to the electronic device 100. For example, the stylus module 410 may be formed with a conductive material in which a current flows to generate an input on a capacitive touch pad.

The processor 420 may control various functions related to the operation of the peripheral device 110. For example, the processor 420 may analyze instructions received from at least one other element included in the peripheral device 110 through the bus 400 and execute calculations and data processing according to the analyzed instructions. Further, the processor 420 may control a function for providing various services by executing one or more programs stored in the memory 430. For example, the processor 420 may perform the corresponding operation by executing at least one program related to the operation of the electronic device 100 among programs stored in the memory 430.

According to various embodiments, the processor 420 may detect an event for detachment and/or attachment of the electronic device 100 and the peripheral device 110, and perform a function of generating a magnetic force that generates a particular polarity through the EPM control module 490 or controlling a strength of the magnetic force according to the detected event. For example, the processor 420 may detect the generation of the event for the detachment and/or attachment of the electronic device 110 and the peripheral device 110 by at least one key button located at the peripheral device 110, a user input through the touch screen, or a signal input from the electronic device 100. For example, when a press of the at least one key button 113 is detected or a selection of an attachment/detachment event icon 591 displayed on the display is detected, as illustrated in FIG. 5C, the processor 420 may amplify or attenuate the magnetic force of the EPM included in the EPM module. The processor 420 may change or maintain the polarity of the EPM included in the peripheral device 110 in consideration of at least one of the polarity of the magnetic force that is generated by the current EPM and the polarity of the magnetic force that is generated by the EPM of the electronic device 100. At this time, the processor 420 may transfer polarity information for the detachment from and/or attachment to the electronic device 100.

According to various embodiments, when an event for the detachment and/or attachment of the electronic device 100 and the peripheral device 110 is detected, the processor 420 may perform a user authentication. When a user authentication process is successfully completed, the processor 420 may perform a function of generating the magnetic force that generates a particular polarity through the EPM control module 490 or controlling a strength of the magnetic force according to the detected event. For example, when the event for the detachment and/or attachment of the electronic device 100 and the peripheral device 110 is detected, the processor 420 may provide an interface that makes a request for a fingerprint input and perform the user authentication process through recognition of the user's fingerprint. Here, a user authentication scheme using the user's fingerprint may be performed according to various known schemes.

According to various embodiments, when the peripheral device 110 is attached to the electronic device 100, the processor 420 may receive charging power from the electronic device 100 or provide charging power to the electronic device 100. For example, when the peripheral device 110 is attached to the electronic device 100 and the residual power amount of the electronic device 100 is smaller than a first threshold and the residual power amount of the peripheral device 110 is larger than or equal to a second threshold, the processor 420 may receive a request for providing charging power from the electronic device 100. Accordingly, the processor 420 may provide a charging current to the electronic device 100. Here, the first threshold and the second threshold may be the same as each other or may be different from each other. Further, when the peripheral device 110 is attached to the electronic device 100, the processor 420 may determine a device to receive charging power by a user's gesture and perform a function for charging the determined device. In addition, when the charging current provided from the electronic device 100 is detected, the processor 420 may perform a function for charging a battery (not shown) of the peripheral device 110. Here, the peripheral device 110 may provide the charging current to the electronic device 100 or receive the charging current from the electronic device 100 through a power terminal included in the EPM module. In the above described example, although the peripheral device 110 operates according to a control of the electronic device 100 as the electronic device 100 determines the device to receive the charging power, the peripheral device 110 may determine the device to receive the charging power based on a residual power amount of the electronic device 100 and a residual power amount of the peripheral device 110. Further, the peripheral device 110 may determine the device to receive the charging power through a recognition of a user's gesture.

According to various embodiments, the processor 420 may receive information on an application being executed in the electronic device 100 from the electronic device 100 and determine an operation mode of the peripheral device 110 based on attachment or detachment of the electronic device 100 and the peripheral device 110 and the received information on the application. For example, the processor 420 may receive identification information of the application and state information of the application from the electronic device 100 through a data channel of the EPM module and a short-range wireless communication module. The processor 420 may identify a preset mode and/or a preset operation mapped to the received identification information of the application and the state information of the application according to the attachment and detachment state between the electronic device 100 and the peripheral device 110, and execute the identified mode and/or operation.

For example, when information indicating "application identification information: camera application identifier (ID) and application state information: preview mode" is received from the electronic device 100 in a state where the peripheral device 110 is attached to the electronic device 100, the processor 420 may execute a camera menu mode and display menu buttons for setting a camera photographing environment on the screen. At this time, when a particular menu button selection by the user is detected, the processor 420 may transfer a photographing instruction signal to the electronic device 100.

Figure 13A:
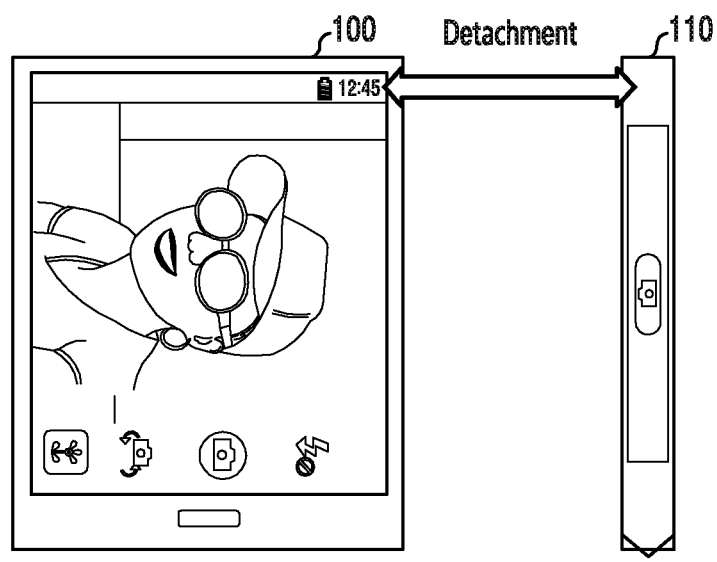
FIGS. 13A to 13C illustrate an example of an operation of a peripheral device based on an application being executed in an electronic device according to an embodiment of the present disclosure.
Figure 13B:
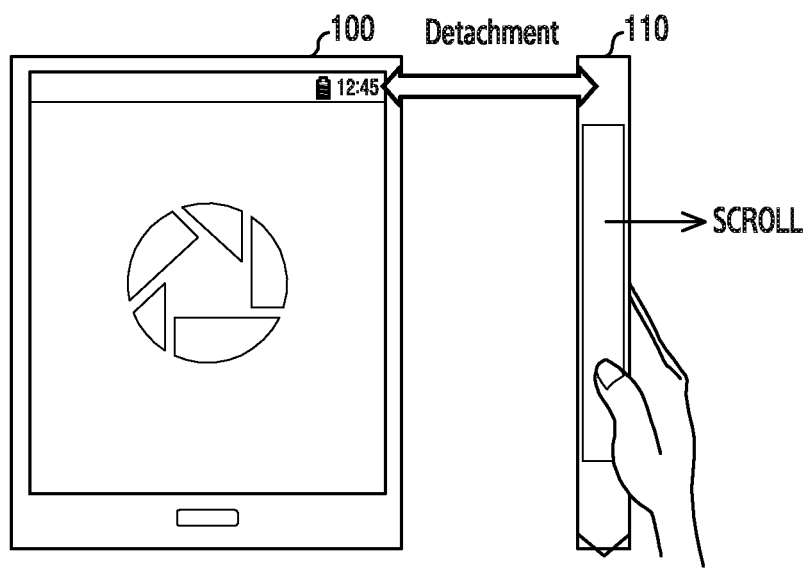
Figure 13C:
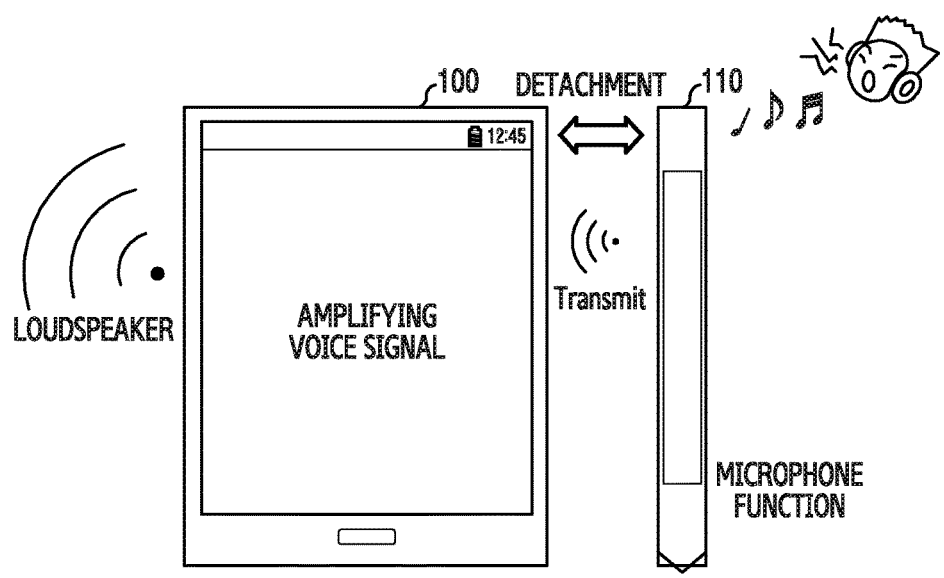

In another example, as illustrated in FIG. 13A, when information indicating "application identification information: camera application ID and application state information: preview mode" is received from the electronic device 100 in a state where the peripheral device 110 is not attached to the electronic device 100, the processor 420 may execute a camera remote control mode and display a shutter button for the photographing on the screen. At this time, when a shutter button selection by the user is detected, the processor 420 may transfer a photographing instruction signal to the electronic device 100. At this time, the processor 420 may receive information indicating "application identification information: camera application ID and application state information: photographing image display mode" from the electronic device 100. The processor 420 may display a button for returning to a preview screen on the screen while maintaining the execution of the camera remote control mode. In another example, as illustrated in FIG. 13B, when information indicating "application identification information: web browser application ID and application state information: webpage display mode" is received from the electronic device 100 in a state where the peripheral device 110 is not attached to the electronic device 100, the processor 420 may execute a webpage control mode and display a scroll bar. At this time, when a scroll bar is moved by the user, the processor 420 may transmit a signal indicating a movement of the scroll bar to the electronic device 100. In another example, as illustrated in FIG. 13C, when information indicating "application identification information: loudspeaker application ID and application state information: voice signal input mode" is received from the electronic device 100 in a state where the peripheral device 110 is not attached to the electronic device 100, the processor 420 may execute a microphone mode and display a voice signal input request message.

According to various embodiments, when a message for a first application is received from the electronic device 100, the processor 420 may display the received message on the display of the peripheral device 110 by using the first application. When a reply writing event by a user's control is detected, the processor 420 may recognize the writing based on a movement of the peripheral device 110 by driving the sensor 440. When a reply transmission event is detected, the processor 420 may generate the message for the first application based on a result of the writing recognition and transmit the generated message for the first application to the electronic device 100. At this time, the message for the first application may include text (for example, letters, numbers, and symbols) and/or images acquired through the writing recognition, identification information of the first application, and information on an electronic device (for example, the other electronic device 104) to receive the corresponding message. Here, the processor 420 may detect the generation of the reply writing event and/or the reply transmission event by a press of at least one key button included in the peripheral device 110 or a detection of a touch on the display. According to various embodiments, the key button for triggering the reply writing event and the key button for triggering the reply transmission event may be the same as each other or may be different from each other. According to various embodiments, when the key button for triggering the reply writing event and the key button for triggering the reply transmission event are the same, the processor 420 may detect the generation of the reply writing event if the corresponding key button is pressed once and may detect the reply transmission event if the corresponding key button is pressed again. In another example, the processor 420 may detect the generation of the reply writing event when the corresponding key button is pressed once and may detect the generation of the reply transmission event when the press of the corresponding key button is released. At this time, the processor 420 may generate a message by recognizing the writing while the corresponding key button maintains the pressed state.

The memory 430 may store instructions or data received from at least one element included in the peripheral device 110 or generated by at least one element. For example, the memory 430 may store at least one application program and store at least one program related to the electronic device 100. Further, the memory 430 may store user authentication information for the attachment and detachment of the electronic device 100 and the peripheral device 110. In addition, the memory 430 may store mode and operation information corresponding to the application identification information/ application state information in a case of the attached state, and mode and operation information corresponding to the application identification information/application state information in a case of the detached state.

The memory 430 may include programming modules, such as a kernel, middleware, an API, and applications. Each program module may be configured by at least one of software, firmware, and hardware.

The sensor 440 may include at least one of a gesture sensor, a gyro sensor, an acceleration sensor, a touch detection sensor, and a grip sensor. Particularly, the sensor 440 may drive the gyro sensor for the writing recognition according to a control of the processor 420 and provide data acquired from the gyro sensor to the writing recognition module 460.

The input/output module 450 may transfer an instruction or data generated by a user's selection or gesture to the processor 420 or the memory 430 through the bus 400. Further, the input/output module 450 may receive an instruction or data generated by a control of the processor 420 or data stored in the memory 430 through the bus 400 and provide the received data to the user. The input/output module 450 may include at least one of a physical key button, a physical keypad, a touch pad, a touch detection sensor, a touch panel, a microphone, and a speaker. Further, the input/output module 450 may convert a digital voice signal generated by an executed application into an analog signal and provide the converted analog signal to the user under a control of the processor 420. The input/output module 450 may convert an analog voice signal input from the user into a digital signal and provide the converted digital signal to the processor 420. The input/output module 450 may detect a user's touch for the display module 470 by using the touch panel located on a lower end of the display panel or the touch detection sensor, and transfer a result of the detected touch to the processor 420.

The writing recognition module 460 may analyze writing data provided from the sensor 440, convert the writing data into text data and/or image data, and provide the converted data to the processor 420.

The display module 470 may display a video, an image, or data to the user. The display module 470 according to an embodiment of the present disclosure may display information indicating whether the peripheral device 110 is being attached to the electronic device 100. Further, the display module 470 may display graphics that make a request for a user authentication for the attachment or detachment of the electronic device 100 and the peripheral device 110 on the display of the peripheral device 110. The display module 470 may display graphics indicating that a link operation with the electronic device 100 is being performed. For example, the display module 470 may display graphics indicating that charging power is being provided to the electronic device 100 or graphics indicating that charging power is being received from the electronic device 100. The display module 470 may display various graphics according to the operation of the processor 420.

The communication module 480 may connect communication between the peripheral device 110 and the electronic device 100. For example, the communication module 480 may communicate with the electronic device 100 through short-range wireless communication. Wireless communication may include, for example, at least one of Wi-Fi, BT, BLE, NFC, and GPS. According to various embodiments, the communication module 480 may communicate with the electronic device 100 by using BLE.

The EPM control module 490 may include at least one EPM module as illustrated in FIG. 1. The EPM module may include an EPM, a data channel terminal, a power terminal, and a ground terminal. The EPM control module 490 may perform a control function for changing a polarity of a magnetic force of the EPM included in the EPM module or controlling a strength of the magnetic force. Further, the EPM control module 490 may perform a function of providing a signal to the electronic device 100 through the data channel included in the EPM module and receiving a signal from the electronic device 100. In addition, the EPM control module 490 may perform a function of transferring residual power of the battery of the peripheral device 110 to the electronic device 100 through the power terminal included in the EPM module or transferring power (or charging current) from the electronic device 100 to the battery of the peripheral device 110 through the power terminal included in the EPM module.

Although not illustrated in FIG. 4, the peripheral device 110 may further include at least one other element.

Figure 5A:
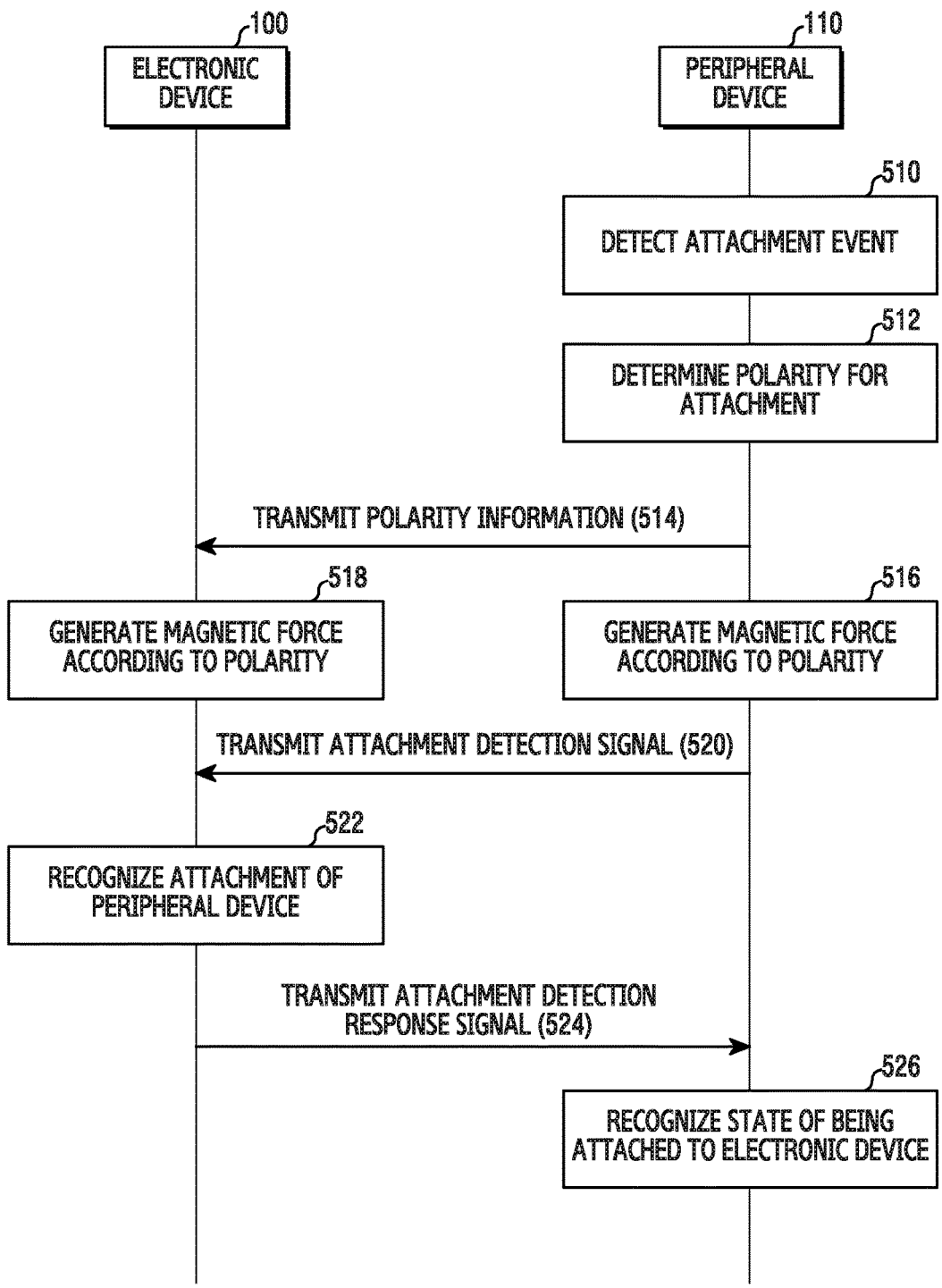
FIG. 5A illustrates an attachment process between an electronic device and a peripheral device according to an embodiment of the present disclosure.

FIG. 5A illustrates an attachment process between the electronic device and the peripheral device according to an embodiment of the present disclosure. Here, a process for attaching the peripheral device 110 to the electronic device 100 in a state where the peripheral device 110 is not attached to the electronic device 100.

FIG. 5C illustrates an example of a state in which the electronic device and the peripheral device perform an attachment and a detachment by using a magnetic force according to an embodiment of the present disclosure.

Referring to FIG. 5A, the peripheral device 110 may detect an attachment event at operation 510. For example, as illustrated in FIG. 5C, when a press of at least one key button 113 located at the peripheral device 110 is detected or a touch of an attachment/detachment event icon for triggering an attachment/detachment event displayed on the display of the peripheral device 110 is detected in a state where the peripheral device 110 is not attached to the electronic device 100, the peripheral device 110 may detect generation of the attachment event.

The peripheral device 110 determines a polarity for the attachment to the electronic device 100 at operation 512. The peripheral device 110 may determine at least one of a polarity of a magnetic force to be generated through at least one EPM included in the peripheral device 110 and a polarity of a magnetic force to be generated through at least one EPM included in the electronic device 100. Hereinafter, for convenience for the description, at least one EPM included in the electronic device 100 is referred to as a first EPM, and at least one EPM included in the peripheral device 110 is referred to as a second EPM. According to various embodiments, the peripheral device 110 may determine polarities such that the first EPM and the second EPM have the magnetic force having different polarities. Further, the peripheral device 110 may determine a strength of the magnetic force for at least one of the first EPM and the second EPM. For example, in order to attach the peripheral device 110 to the electronic device 100 with a strong force, the peripheral device 110 may determine the polarities of the first EPM and the second EPM to be opposite to each other and determine the strength of the magnetic force of at least one of the first EPM and the second EPM to be larger than a threshold value.

The peripheral device 110 may transmit polarity information to the electronic device 100 at operation 514. For example, the peripheral device 110 may transmit one piece of information among polarity information of the first EPM, polarity information of the second EPM, magnetic force strength information of the first EPM, and magnetic force strength information of the second EPM to the electronic device 100. At this time, the peripheral device 110 may transmit the polarity information to the electronic device 100 by using a short-range wireless communication scheme such as a BLE module.

The peripheral device 110 may generate a magnetic force of a first polarity through the second EPM based on the determined polarity at operation 516. Further, the electronic device 100 may generate a magnetic force of a second polarity through the first EPM based on the polarity information received from the peripheral device 110 at operation 518. At this time, the first polarity of the first EPM and the second polarity of the second EPM may be opposite polarities having an attraction characteristic. Further, for the attachment between the peripheral device 110 and the electronic device 100 with the strong force at operations 516 and 518, the first EPM and the second EPM may generate magnetic forces having the strength larger than a threshold value.

The peripheral device 110 may transmit an attachment detection signal at operation 520. For example, after generating the magnetic force of the first polarity through the second EPM, the peripheral device 110 may periodically transmit the attachment detection signal through the data channel terminal included in the EPM module. Here, the attachment detection signal may be a signal for identifying whether the peripheral device 110 is attached to the electronic device 100.

When the attachment detection signal is received from the peripheral device 110, the electronic device 100 may recognize the attachment of the peripheral device 110 to the electronic device 100 at operation 522. For example, when the EPM module of the peripheral device 110 and the EPM module of the electronic device 100 contact each other, the attachment detection signal may be transferred to the electronic device 100 from the peripheral device 110 through the data channel terminal included in the EPM module of the peripheral device 110 and the data channel terminal included in the EPM module of the electronic device 100. Accordingly, when the attachment detection signal is received from the peripheral device 110, the electronic device 100 may recognize the attachment of the peripheral device 110 to the electronic device 100.

The electronic device 100 may transmit an attachment detection response signal to the peripheral device 110 at operation 524. For example, the electronic device 100 may transmit the attachment detection response signal indicating the attachment of the peripheral device 110 to the electronic device 100 to the peripheral device 110 through the data channel terminal included in the EPM module of the electronic device 100. When the attachment detection response signal is received from the electronic device 100, the peripheral device 110 recognizes the attachment of the peripheral device 110 to the electronic device 100 at operation 526. The peripheral device 110 may store information indicating that the peripheral device 110 is attached to the electronic device 100. Here, before a detachment event is generated, the electronic device 100 and the peripheral device 110 maintain polarities and strengths of the magnetic forces of the first EPM and the second EPM.

Although the peripheral device 110 transmits the attachment detection signal in FIG. 5A, the electronic device 100 may transmit the attachment detection signal and the peripheral device 110 may transmit the attachment detection response signal in response to the attachment detection signal according to various embodiments.

Figure 5B:
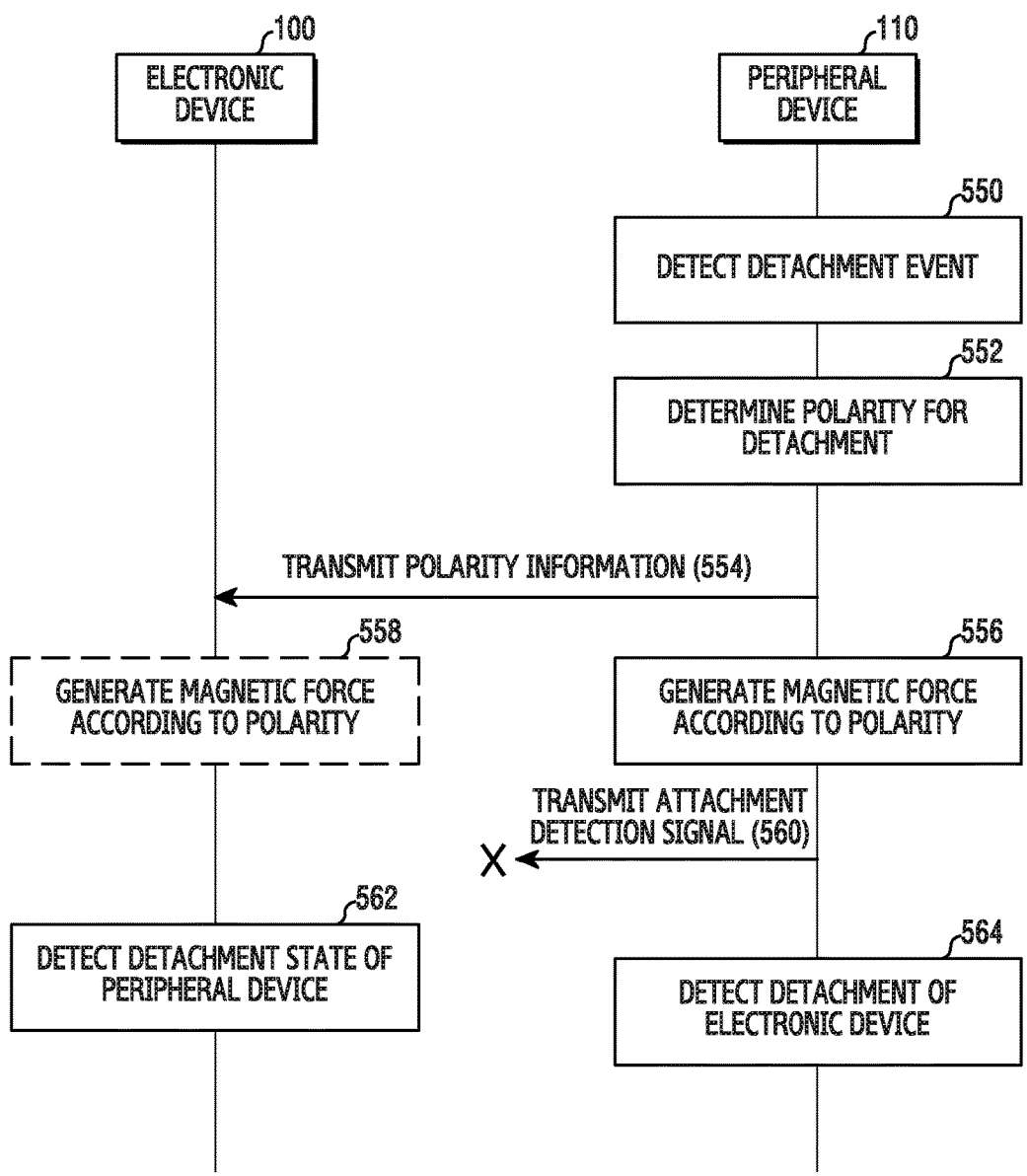
FIG. 5B illustrates a detachment process between an electronic device and a peripheral device according to an embodiment of the present disclosure.
Figure 5C:
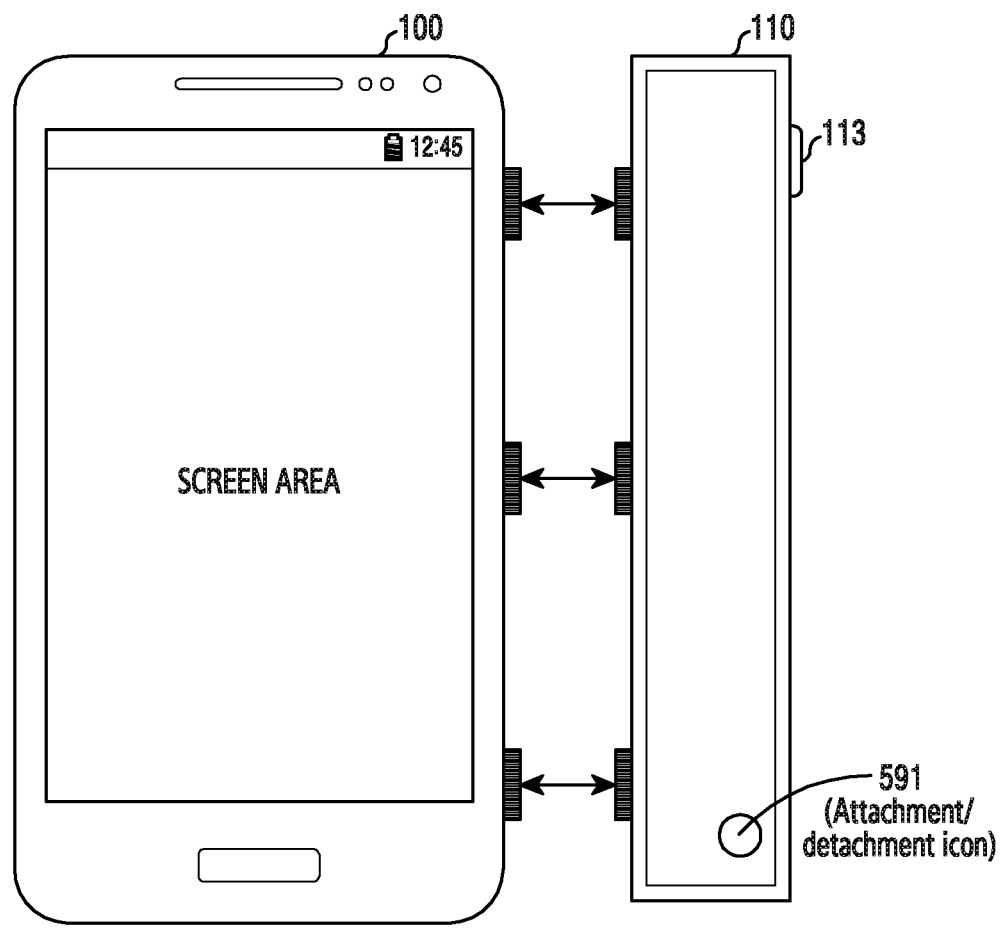
FIG. 5C illustrates an example of a state in which an electronic device and a peripheral device perform an attachment and a detachment by using a magnetic force according to an embodiment of the present disclosure.

FIG. 5B illustrates a detachment process between the electronic device and the peripheral device according to an embodiment of the present disclosure. Here, a process in which the peripheral device 110 is detached from the electronic device 100 in a state where the peripheral device 110 is attached to the electronic device 100 will be described.

Referring to FIG. 5B, the peripheral device 110 may detect a detachment event at operation 550.

Referring to FIG. 5C, when a press of at least one key button 113 located at the peripheral device 110 is detected or a touch of an attachment/detachment event icon for triggering an attachment/detachment event displayed on the display of the peripheral device 110 is detected in a state where the peripheral device 110 is attached to the electronic device 100, the peripheral device 110 may detect generation of the detachment event.

The peripheral device 110 may determine a polarity for the detachment from the electronic device 100 at operation 552. The peripheral device 110 may determine a polarity of a magnetic force to be generated through at least one EPM included in the peripheral device 110 and a polarity of a magnetic force to be generated through at least one EPM included in the electronic device 100. Hereinafter, for convenience for the description, at least one EPM included in the electronic device 100 is referred to as a first EPM, and at least one EPM included in the peripheral device 110 is referred to as a second EPM. According to various embodiments, the peripheral device 110 may determine the polarities such that the first EPM and the second EPM generate magnetic forces of the same polarity. Further, when the peripheral device 110 knows polarity information of the first EPM, the peripheral device 110 may determine the polarity of the second EPM based on the polarity information of the first EPM. The peripheral device 110 may determine the polarity of the second EPM to be opposite to the current polarity. The peripheral device 110 may determine a strength of the magnetic force for at least one of the first EPM and the second EPM. For example, in order to detach the peripheral device 110 from the electronic device 100 by a user's power, the peripheral device 110 may determine a strength of the magnetic force to be smaller than a threshold value in a state where the polarities of the first EPM and the second EPM are maintained to be opposite.

The peripheral device 110 may transmit polarity information to the electronic device 100 at operation 554. For example, the peripheral device 110 may transmit one piece of information among polarity information of the first EPM polarity information of the second EPM, magnetic force strength information of the first EPM, and magnetic force strength information of the second EPM to the electronic device 100. At this time, the peripheral device 110 may transmit the polarity information to the electronic device 100 by using a short-range wireless communication scheme such as a BLE module. According to an embodiment, since the peripheral device 110 is attached to the electronic device 100, the peripheral device 110 may transmit polarity information to the electronic device 100 through the data channel terminal of the second EPM.

The peripheral device 110 may generate a magnetic force of a first polarity through the second EPM based on the determined polarity at operation 556. Further, the electronic device 100 may generate a magnetic force of a second polarity through the first EPM based on the polarity information received from the peripheral device 110 at operation 558. At this time, the first polarity of the first EPM and the second polarity of the second EPM may be the same polarity having a repulsion characteristic. In another example, in order to allow the peripheral device 110 to be detached from the electronic device 100 by user's power at operations 516 and 518, the first EPM and the second EPM may generate magnetic forces having a strength smaller than a threshold value.

The peripheral device 110 may transmit an attachment detection signal at operation 560. For example, after generating the magnetic force of the first polarity through the second EPM, the peripheral device 110 may periodically transmit the attachment detection signal through the data channel terminal included in the EPM module. Here, the attachment detection signal may be a signal for identifying whether the peripheral device 110 is attached to the electronic device 100.

When an attachment detection response signal is not received within a threshold time after the attachment detection signal is transmitted, the peripheral device 110 detects the detachment of the peripheral device 110 from the electronic device 100 at operation 564. For example, since the peripheral device 110 controls the polarity and/or the strength of the second EPM to be detachable from the electronic device 100, the peripheral device 110 may be automatically detached from the electronic device 100 or detached from the electronic device 100 by the user. Accordingly, the attachment detection signal will not be transmitted to the electronic device 100. Therefore, the peripheral device 110 may not receive an attachment detection response signal which is a response signal of the attachment detection signal.

Further, when the electronic device 100 does not receive a signal from the peripheral device 110 after performing operation 558, the electronic device 100 may detect the detachment of the peripheral device 110 from the electronic device 100, at operation 562. For example, when a signal is not detected for a threshold time through the data channel terminal of the first EPM, the electronic device 100 may detect non-attachment of the peripheral device 110 to the electronic device 100.

Although the peripheral device 110 transmits the attachment detection signal in FIG. 5B, the electronic device 100 may transmit the attachment detection signal and the peripheral device 110 may transmit the attachment detection response signal in response to the attachment detection signal according to various embodiments.

Additionally, operations 554 and 558 may be omitted according to various embodiments. For example, when it is determined to change the polarity of the second EPM into an opposite polarity in a state where the peripheral device 110 is attached to the electronic device 100, the peripheral device 110 may be detached from the electronic device 100 since the first EPM and the second EPM generate the magnetic forces having the same polarity even though the electronic device 100 does not control the polarity of the first EPM. As described above, when the peripheral device 110 changes the polarity of the second EPM into the opposite polarity, operations 554 and 558 described above may be omitted.

According to various embodiments, while the peripheral device 110 is attached to the electronic device 100, the electronic device 100 may periodically transmit the attachment detection signal through the data channel terminal included in the first EPM module, inspect whether the attachment detection response signal is received in response to the attachment detection signal, and determine whether the peripheral device 110 is attached to the electronic device 100.

FIGS. 5A and 5B have described the case where the peripheral device 110 detects the attachment event and/or the detachment event. However, according to various embodiments, the electronic device 100 may detect the attachment event and/or the detachment event. In this case, the electronic device 100 may perform the operation of the peripheral device 110 illustrated in FIGS. 5A and 5B in the same way, and the peripheral device 110 may perform the operation of the electronic device 100 illustrated in FIGS. 5A and 5B in the same way.

Figure 6A:
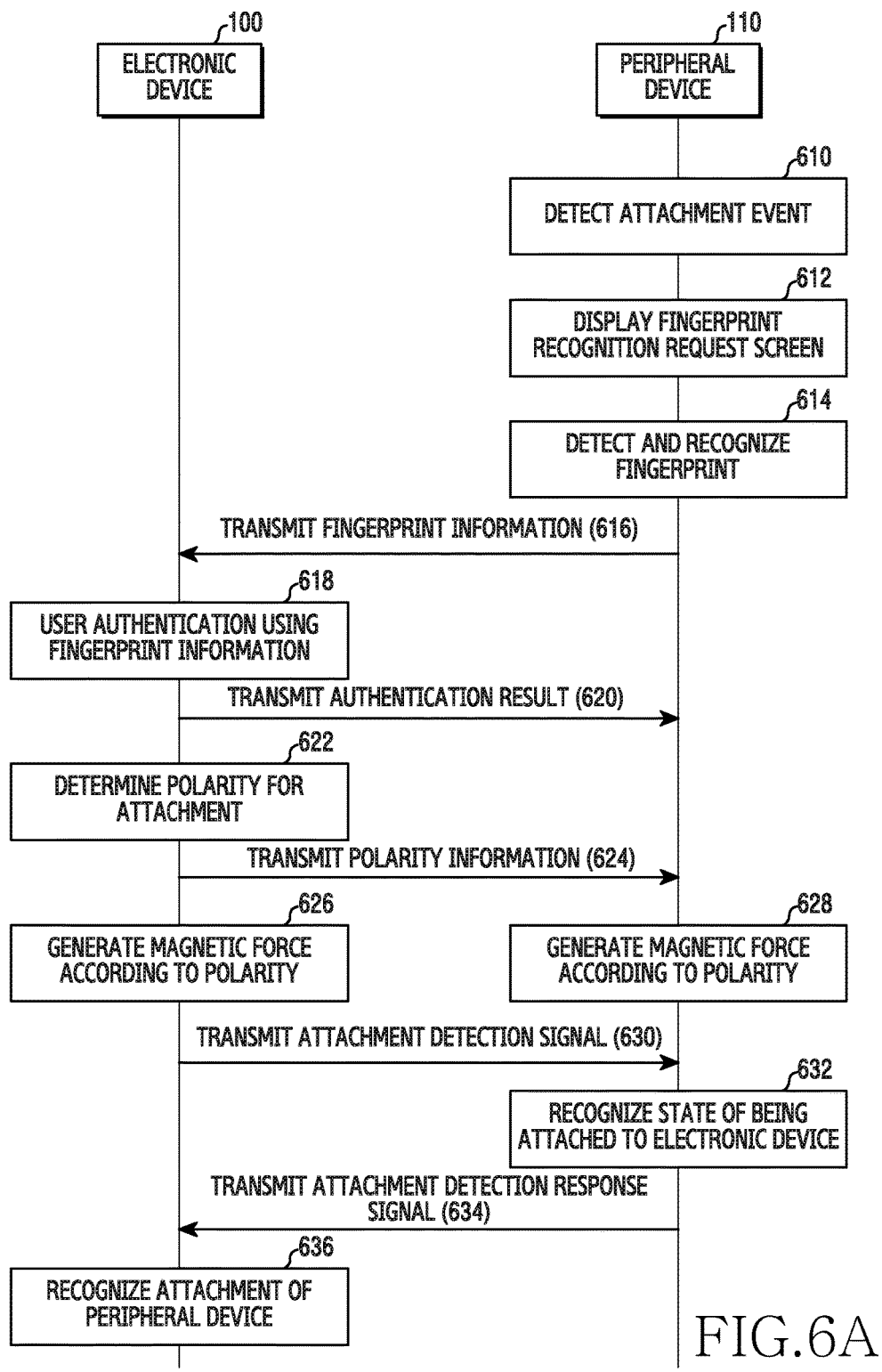
FIG. 6A illustrates an attachment process based on a user authentication in an electronic device and a peripheral device according to an embodiment of the present disclosure.

FIG. 6A illustrates an attachment process based on a user authentication in the electronic device and the peripheral device according to an embodiment of the present disclosure. Here, a process for attaching the peripheral device 110 to the electronic device 100 in a state where the peripheral device 110 is not attached to the electronic device 100.

Referring to FIG. 6A, the peripheral device 110 may detect an attachment event at operation 610. For example, as illustrated in FIG. 5C, when a press of at least one key button 113 located at the peripheral device 110 is detected or a touch of an attachment/detachment event icon for triggering an attachment/detachment event displayed on the display of the peripheral device 110 is detected in a state where the peripheral device 110 is not attached to the electronic device 100, the peripheral device 110 may detect generation of the attachment event.

Figure 6B:
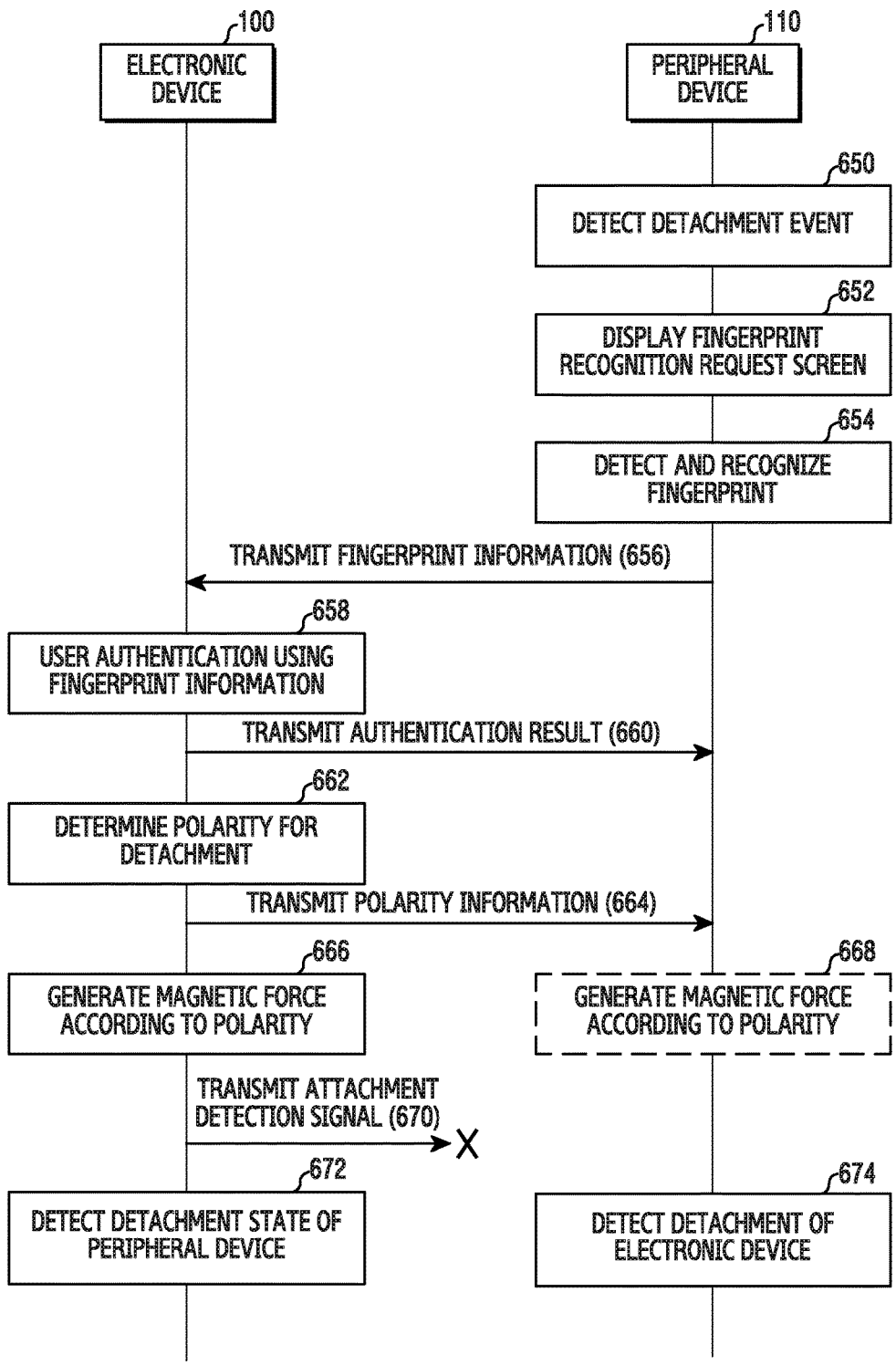
FIG. 6B illustrates a detachment process based on a user authentication in an electronic device and a peripheral device according to an embodiment of the present disclosure.
Figure 6C:
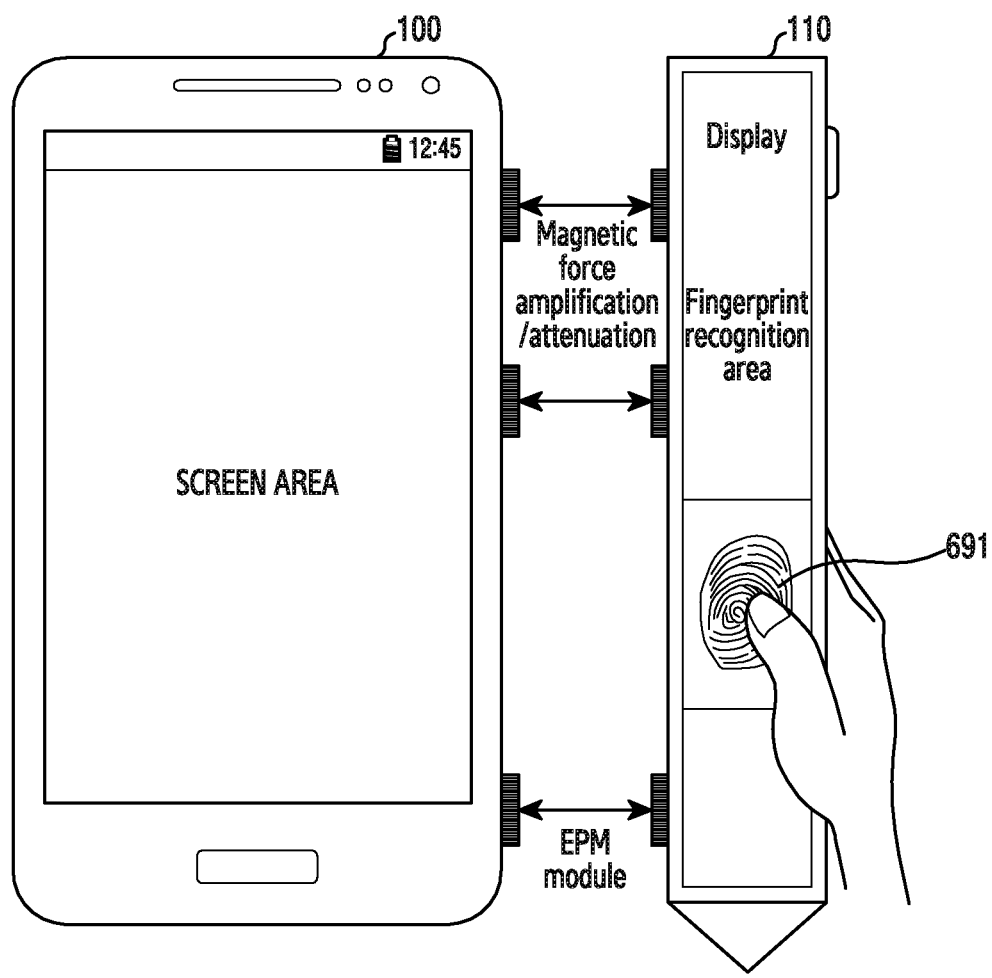
FIG. 6C illustrates an example of a state in which an electronic device and a peripheral device perform an attachment and a detachment through a user authentication according to an embodiment of the present disclosure.

FIG. 6C illustrates an example of a state in which the electronic device and the peripheral device perform an attachment and a detachment through a user authentication according to an embodiment of the present disclosure.

The peripheral device 110 may display a fingerprint recognition request screen at operation 612. For example, the peripheral device 110 may provide an interface that induces the user to touch a particular area of the display by a finger 691 for fingerprint recognition, as illustrated in FIG. 6C. The peripheral device 110 may detect and recognize the fingerprint at operation 614. Here, the detection and the recognition of the fingerprint may use fingerprint recognition technology known to those skilled in the art. The peripheral device 110 may transmit fingerprint information including a fingerprint recognition result to the electronic device 100 at operation 616. At this time, the fingerprint information may be transmitted to the electronic device 100 through a short-range wireless communication scheme such as BLE.

When the fingerprint information is received from the peripheral device 110, the electronic device 100 may perform a user authentication by using the received fingerprint information at operation 618. For example, the electronic device 100 may perform the user authentication by comparing pre-registered user's fingerprint information with the fingerprint information received from the peripheral device 110. The pre-registered user's fingerprint information may be fingerprint information registered in the electronic device 100 through a user registration process or fingerprint information received from another electronic device 100. The fingerprint information may include an authentication key for the user's fingerprint.

The electronic device 100 may transmit an authentication result to the peripheral device 110 at operation 620. The electronic device 100 may transmit the authentication result to the peripheral device 110 through a short-range wireless communication scheme such as BLE. The authentication result may include information on whether the user authentication is successful and/or the attachment of the peripheral device 110 is accepted. According to various embodiments, operation 620 may be omitted.

The electronic device 100 may determine a polarity for the attachment of the peripheral device 110 at operation 622. The electronic device 100 may determine at least one of the polarity of the magnetic force to be generated through at least one EPM included in the electronic device 100 and the polarity of the magnetic force to be generated through at least one EPM included in the peripheral device 110. Hereinafter, for convenience of the description, at least one EPM included in the electronic device 100 is referred to as a first EPM, and at least one EPM included in the peripheral device 110 is referred to as a second EPM. According to various embodiments, the electronic device 100 may determine polarities such that the first EPM and the second EPM generate magnetic forces of opposite polarities. Further, the electronic device 100 may determine a strength of the magnetic force for at least one of the first EPM and the second EPM. For example, in order to attach the peripheral device 110 to the electronic device 100 with a strong force, the electronic device 100 may determine the polarities of the first EPM and the second EPM to be opposite to each other and determine the strength of the magnetic force of at least one of the first EPM and the second EPM to be larger than a threshold value.

The electronic device 100 may transmit polarity information to the peripheral device 110 at operation 624. For example, the electronic device 100 may transmit information on one piece of polarity information of the first EPM, polarity information of the second EPM, magnetic force strength information of the first EPM, magnetic force strength information of the second EPM to the peripheral device 110. At this time, the electronic device 100 may transmit the polarity information to the peripheral device 110 through a short-range wireless communication scheme such as BLE.

The electronic device 100 may generate a magnetic force of a first polarity through the first EPM based on the determined polarity at operation 626. Further, the peripheral device 110 may generate a magnetic force of a second polarity through the second EPM based on the polarity information received from the electronic device 100 at operation 628. At this time, the first polarity of the first EPM and the second polarity of the second EPM may be opposite polarities having an attraction characteristic. Further, for the attachment between the peripheral device 110 and the electronic device 100 with the strong force at operations 626 and 628, the first EPM and the second EPM may generate magnetic forces having the strength larger than a threshold value.

The electronic device 100 may transmit an attachment detection signal at operation 630. For example, after generating the magnetic force of the first polarity through the first EPM, the electronic device 100 may periodically transmit the attachment detection signal through the data channel terminal included in the EPM module. Here, the attachment detection signal may be a signal for identifying whether the peripheral device 110 is attached to the electronic device 100.

When the attachment detection signal is received from the electronic device 100, the peripheral device 110 may recognize the attachment of the peripheral device 110 to the electronic device 100, at operation 632. For example, when the EPM module of the peripheral device 110 and the EPM module of the electronic device 100 contact each other, the attachment detection signal may be transferred to the peripheral device 110 from the electronic device 100 through the data channel terminal included in the EPM module of the peripheral device 110 and the data channel terminal included in the EPM module of the electronic device 100. Accordingly, when the attachment detection signal is received from the electronic device 100, the peripheral device 110 may recognize the attachment of the peripheral device 110 to the electronic device 100.

The peripheral device 110 may transmit an attachment detection response signal to the electronic device 100 at operation 634. For example, the peripheral device 110 may transmit the attachment detection response signal indicating the attachment of the peripheral device 110 to the electronic device 100 to the electronic device 100 through the data channel terminal included in the EPM module of the peripheral device 110. When the attachment detection response signal is received from the peripheral device 110, the electronic device 100 may recognize the attachment of the peripheral device 110 to the electronic device 100, at operation 636. The electronic device 100 may store information indicating that the peripheral device 110 is attached to the electronic device 100. Here, before a detachment event is generated, the electronic device 100 and the peripheral device 110 maintain polarities and strengths of the magnetic forces of the first EPM and the second EPM.

Although the electronic device 100 transmits the attachment detection signal in FIG. 6A, the peripheral device 110 may transmit the attachment detection signal and the electronic device 100 may transmit the attachment detection response signal in response to the attachment detection signal according to various embodiments.

FIG. 6B illustrates a detachment process based on a user authentication in the electronic device and the peripheral device according to an embodiment of the present disclosure. Here, a process in which the peripheral device 110 is detached from the electronic device 100 in a state where the peripheral device 110 is attached to the electronic device 100 will be described.

Referring to FIG. 6B, the peripheral device 110 detects a detachment event at operation 650. For example, as illustrated in FIG. 5C, when a press of at least one key button 113 located at the peripheral device 110 is detected or a touch of an attachment/detachment event icon for triggering an attachment/detachment event displayed on the display of the peripheral device 110 is detected in a state where the peripheral device 110 is attached to the electronic device 100, the peripheral device 110 may detect generation of the detachment event.

The peripheral device 110 may display a fingerprint recognition request screen at operation 652. For example, the peripheral device 110 may provide an interface that induces the user to touch a particular area of the display by a finger 691, as illustrated in FIG. 6C. The peripheral device 110 may detect and recognize the fingerprint at operation 654. Here, the detection and the recognition of the fingerprint may use fingerprint recognition technology known to those skilled in the art. The peripheral device 110 may transmit fingerprint information including a fingerprint recognition result to the electronic device 100 at operation 656. At this time, the fingerprint information may be transmitted to the electronic device 100 through a short-range wireless communication scheme such as BLE.

When the fingerprint information is received from the peripheral device 110, the electronic device 100 may perform a user authentication by using the received fingerprint information at operation 658. For example, the electronic device 100 may perform the user authentication by comparing pre-registered user's fingerprint information with the fingerprint information received from the peripheral device 110. The pre-registered user's fingerprint information may be fingerprint information registered through a user registration process or fingerprint information received from another electronic device 100. The fingerprint information may include an authentication key for the user's fingerprint.

The electronic device 100 may transmit an authentication result to the peripheral device 110 at operation 660. The electronic device 100 may transmit the authentication result to the peripheral device 110 through a short-range wireless communication scheme such as BLE. The authentication result may include information on whether the user authentication is successful and/or the attachment of the peripheral device 110 is accepted. According to various embodiments, operation 660 may be omitted.

The electronic device 100 may determine a polarity for the detachment of the peripheral device 110, at operation 662. The electronic device 100 may determine at least one of the polarity of the magnetic force to be generated through at least one EPM included in the electronic device 100 and the polarity of the magnetic force to be generated through at least one EPM included in the peripheral device 110. Hereinafter, for convenience of the description, at least one EPM included in the electronic device 100 is referred to as a first EPM, and at least one EPM included in the peripheral device 110 is referred to as a second EPM. According to various embodiments, the electronic device 100 may determine polarities such that the first EPM and the second EPM generate magnetic forces of the same polarity. Further, when the electronic device 100 knows polarity information of the second EPM, the electronic device 100 may determine the polarity of the first EPM based on the polarity information of the second EPM. The electronic device 100 may determine the polarity of the first EPM to be opposite to the current polarity. Further, the electronic device 100 may determine a strength of the magnetic force for at least one of the first EPM and the second EPM. For example, in order to detach the peripheral device 110 from the electronic device 100 by user's power, the electronic device 100 may determine a strength of the magnetic force to be smaller than a threshold value in a state where the polarities of the first EPM and the second EPM are maintained to be opposite.

The electronic device 100 may transmit polarity information to the peripheral device 110 at operation 664. For example, the electronic device 100 may transmit information on one piece of polarity information of the first EPM, polarity information of the second EPM, magnetic force strength information of the first EPM, and magnetic force strength information of the second EPM to the peripheral device 110. At this time, the electronic device 100 may transmit the polarity information to the peripheral device 110 through a short-range wireless communication scheme such as a BLE module. According to an embodiment, since the electronic device 100 is attached to the peripheral device 110, the electronic device 100 may transmit polarity information to the peripheral device 110 through the data channel terminal of the first EPM module.

The electronic device 100 may generate a magnetic force of a first polarity through the first EPM based on the determined polarity at operation 666. Further, the peripheral device 110 may generate a magnetic force of a second polarity through the second EPM based on the polarity information received from the electronic device 100 at operation 668. At this time, the first polarity of the first EPM and the second polarity of the second EPM may be the same polarity having a repulsion characteristic. In another example, in order to allow the peripheral device 110 to be detached from the electronic device 100 by user's power at operations 666 and 668, the first EPM and the second EPM may generate magnetic forces having a strength smaller than a threshold value.

The electronic device 100 may transmit an attachment detection signal at operation 670. For example, after generating the magnetic force of the first polarity through the first EPM, the electronic device 100 may periodically transmit the attachment detection signal through the data channel terminal included in the EPM module. Here, the attachment detection signal may be a signal for identifying whether the peripheral device 110 is attached to the electronic device 100.

When the electronic device 100 does not receive the attachment detection response signal within a threshold time from transmitting the attachment detection signal, the electronic device 100 may detect the detachment of the peripheral device 110 from the electronic device 100 at operation 672. For example, since the electronic device 100 controls the polarity and/or the strength of the first EPM to be detachable from the peripheral device 110, the electronic device 100 may be automatically detached from the peripheral device 110 or detached from the peripheral device 110 by the user. Accordingly, the attachment detection signal may not be transmitted to the peripheral device 110. Accordingly, the electronic device 100 cannot receive the attachment detection response signal which is a response signal of the attachment detection signal.

Further, when the peripheral device 110 does not receive a signal from the electronic device 100 after performing operation 668, the peripheral device 110 may detect the detachment of the peripheral device 110 from the electronic device 100, at operation 674. For example, when a signal is not detected for a threshold time through the data channel terminal of the second EPM module, the peripheral device 110 may detect non-attachment of the peripheral device 110 to the electronic device 100.

Although the electronic device 100 transmits the attachment detection signal in FIG. 6B, the peripheral device 110 may transmit the attachment detection signal and the electronic device 100 may transmit the attachment detection response signal in response to the attachment detection signal according to various embodiments.

Additionally, operations 664 and 668 may be omitted according to various embodiments. For example, when the electronic device 100 determines to change the polarity of the first EPM into an opposite polarity in a state where the peripheral device 110 is attached to the electronic device 100, the peripheral device 110 may be detached from the electronic device 100 since the first EPM and the second EPM generate the magnetic forces of the same polarity even though the peripheral device 110 does not control the polarity of the second EPM. As described above, when the electronic device 100 changes the polarity of the first EPM into the opposite polarity, operations 664 and 668 described above may be omitted.

According to various embodiments, while the peripheral device 110 is attached to the electronic device 100, the peripheral device 110 may periodically transmit the attachment detection signal through the data channel terminal included in the second EPM module, inspect whether the attachment detection response signal is received in response to the attachment detection signal, and determine whether the peripheral device 110 is attached to or detached from the electronic device 100.

FIGS. 6A and 6B have described the case where the peripheral device 110 detects the attachment event and/or the detachment event. However, according to various embodiments, the electronic device 100 may detect the attachment event and/or the detachment event. Although the peripheral device 110 detects and recognizes the user's fingerprint and transmits the fingerprint to the electronic device 100 in FIGS. 6A and 6B, the electronic device 100 may detect and recognize the user's fingerprint according to embodiments.

Figure 7A:
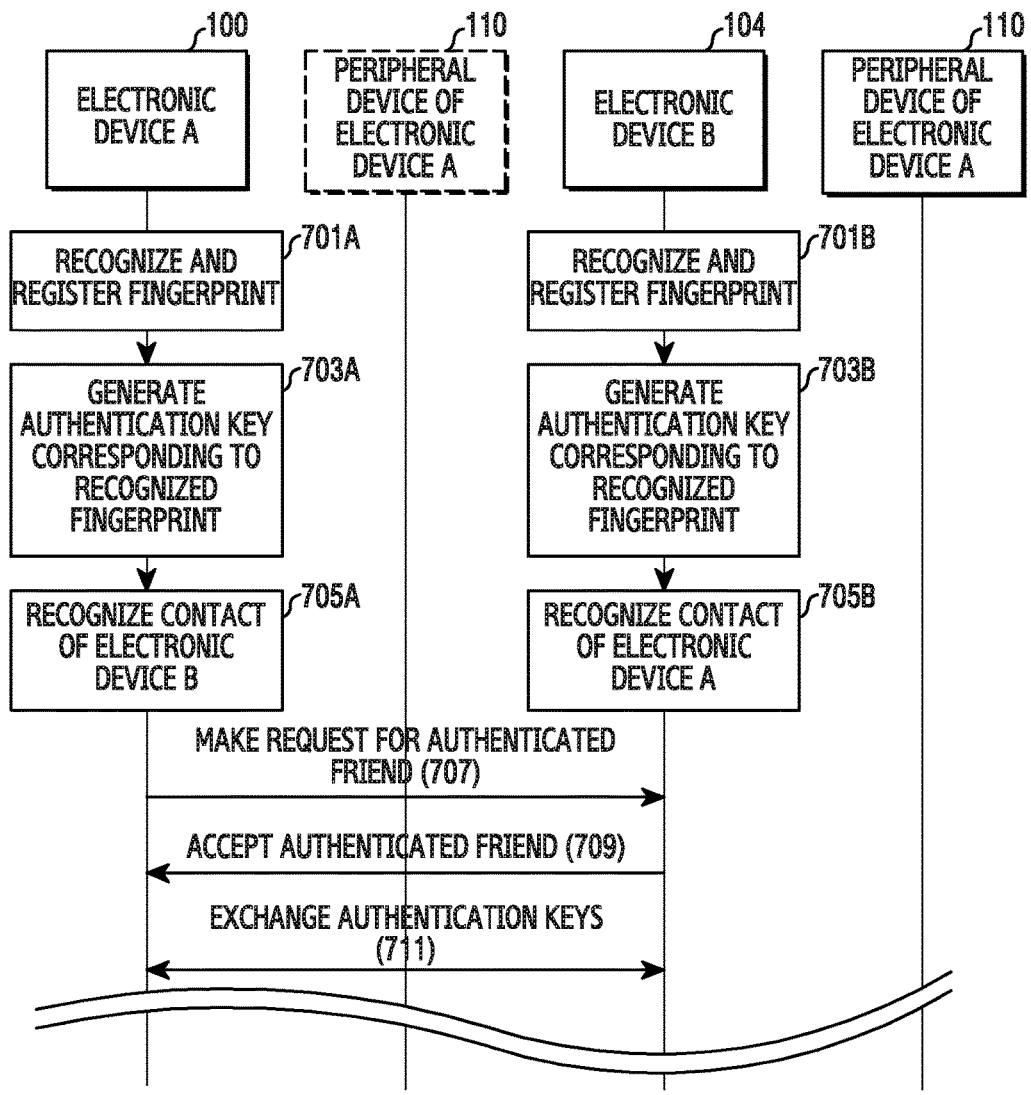
FIGS. 7A and 7B illustrate a process of moving data by using a peripheral device according to an embodiment of the present disclosure.
Figure 7B:
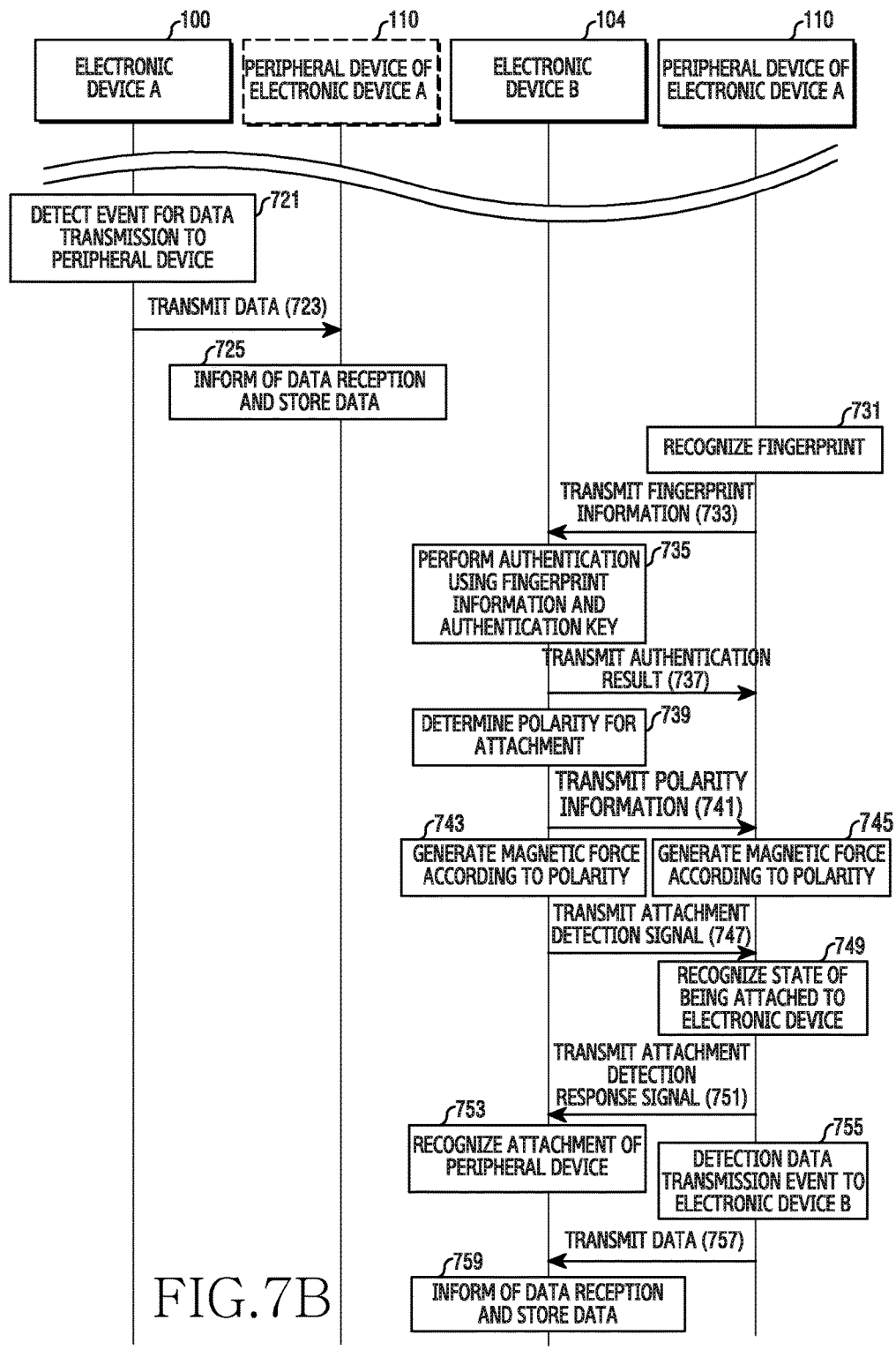

FIGS. 7A and 7B illustrate a process of moving data by using the peripheral device according to an embodiment of the present disclosure. Here, a process of moving data of electronic device A 100 to another electronic device B 104 by using peripheral device 110 of electronic device A 100.

Referring to FIGS. 7A and 7B, electronic device A 100 and the other electronic device B 104 recognize and register the user's fingerprint at operation 701A and 701B, respectively. For example, when a user fingerprint registration event is generated, each of electronic device A 100 and other electronic device B 104 may display a message that makes a request for inputting the fingerprint in a particular area of the display and, when a user's touch on the particular area is detected, may perform a fingerprint detection and recognition function and store a result of the fingerprint recognition in the memory.

The electronic device A 100 and the other electronic device B 104 generate an authentication key corresponding to the recognized fingerprint at operation 703A and 703B, respectively. For example, each of the electronic device A 100 and the other electronic device B 104 may generate an authentication key for a user authentication based on the fingerprint recognition result.

The electronic device A 100 may recognize contacts of the other electronic device B 104, and the other electronic device B 104 may recognize contacts of the electronic device A 100, at operation 705A and 705B, respectively. For example, the electronic device A 100 and the other electronic device B 104 may receive contacts of a counterpart electronic device from the user or recognize the contacts of the counterpart electronic device from a pre-registered contact list by a user's selection. The electronic device A 100 and the other electronic device B 104 may perform operations 701A and 701B, 703A and 703B, and 705A and 705B, respectively, at the same time. However, the electronic device A 100 and the other electronic device B may not perform the operations 701A and 701B, 703A and 703B, and 705A and 705B, respectively, at the same time. For example, it is apparent that the electronic device A 100 may first perform operations 701A, 703A, and 705A by a user's request and then the other electronic device B 104 may perform operations 701B, 703B, and 705B later.

The electronic device A 100 may transmit an authenticated friend request message to the other electronic device B 104 of which the contacts have been recognized at operation 707. At this time, the authenticated friend request message may be transmitted through a short-range wireless communication scheme such as BLE. The other electronic device B 104 may transmit an authenticated friend acceptance message to electronic device A 100 at operation 709. For example, when the authenticated friend request message is received, the other electronic device B 104 may display a message indicating that the authenticated friend request message has been received from the electronic device A 100 on the display of the other electronic device B 104 and determine whether to accept the authenticated friend by a user control. Although not illustrated, according to various embodiments, when it is determined to reject the authenticated friend by a user's control, the other electronic device B 104 may transmit an authenticated friend rejection message to the electronic device A 100. In this case, operation 711 described below and the following operations of FIG. 7B may not be performed. According to an embodiment of the present disclosure, it is assumed that the authenticated friend acceptance is determined by a user's control.

The electronic device A 100 and the other electronic device B 104 may exchange authentication keys at operation 711. For example, the electronic device A 100 may transmit the authentication key generated at operation 703 to the other electronic device B 104 and the other electronic device B 104 may transmit the authentication key generated at operation 703 to the electronic device A 100 at operation 711. According to various embodiments, the other electronic device B 104 may insert the authentication key into the authenticated friend acceptance message and transmit the authenticated friend acceptance message at operation 709.

Thereafter, referring to FIG. 7B, the electronic device A 100 may detect the generation of an event for transmitting data to the peripheral device 110 in a state where the peripheral device 110 of the electronic device A 100 is attached to the electronic device A 100 at operation 721. The electronic device 100 may detect generation of a data transmission event by a user's gesture, a key button input, or a touch detection.

Figure 8:
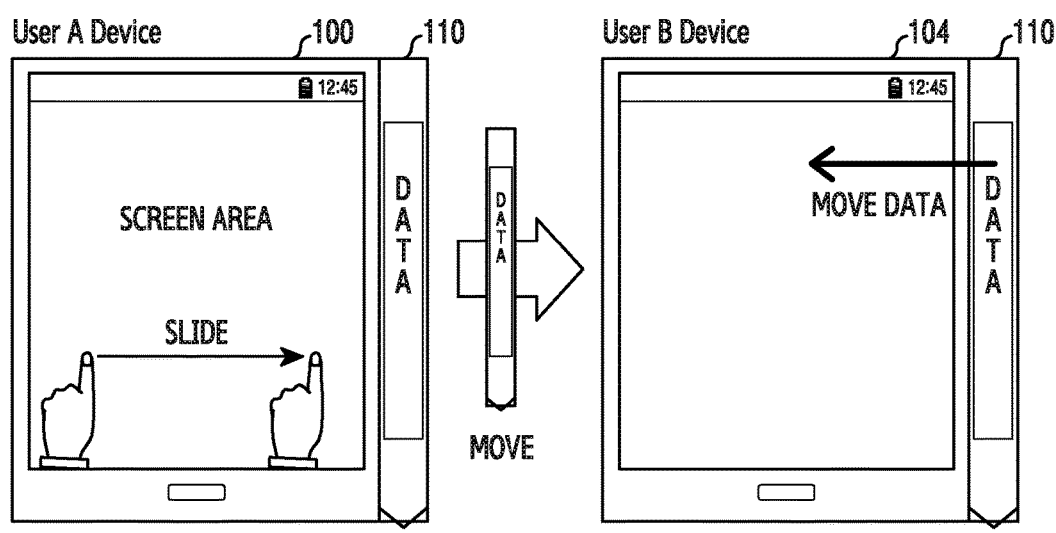
FIG. 8 illustrates an example of a type in Which data is moved using a peripheral device according to an embodiment of the present disclosure.

FIG. 8 illustrates an example of a type in which data is moved using the peripheral device according to an embodiment of the present disclosure.

Referring to FIGS. 7B and 8, when a drag in a direction of the attachment of the peripheral device 110 is detected in a predetermined area of the touch screen in a state where the peripheral device 110 is attached to the electronic device A 100, the electronic device A 100 may detect the generation of the data transmission event to the peripheral device 110. The electronic device A 100 having detected the data transmission event may transmit data selected by the user to the peripheral device 110 at operation 723. According an embodiment, the electronic device A 100 may transmit contents currently displayed on the touch screen (for example, image files, music files, video files, and various types of document files) to the peripheral device 110. According to an embodiment, the electronic device A 100 may transmit contents at a location where a user's touch is generated on the current touch screen to the peripheral device 110. According to an embodiment, the electronic device A 100 may capture an image displayed on the current touch screen and transmit the captured image to the peripheral device 110. At this time, the electronic device A 100 may transmit data to the peripheral device 110 through the data channel terminal of the EPM module of the electronic device A 100 or transmit data to the peripheral device 110 through the short-range wireless communication module such as BLE.

When data is received from the electronic device A 100, the peripheral device 110 may inform the user that the data is received and stores the received data at operation 725. For example, the peripheral device 110 may display a message or a graphic element (for example, icon) indicating that the data is being received from the electronic device A 100 or display a message or a graphic element indicating that the reception of the data from the electronic device A 100 has been completed. According to an embodiment, the peripheral device 110 may output a voice signal indicating that the reception of the data from the electronic device A 100 has been completed or generate a vibration.

Thereafter, although not illustrated, after the peripheral device 110 is detached from the electronic device A 100 by a user's control, the peripheral device 110 may attempt to attach the other electronic device B 104. At this time, the detachment of the peripheral device 110 from the electronic device A 100 may be performed according to the process illustrated in FIG. 5B or 6B described above. Further, when the process of at least one key button 113 located at the peripheral device 110 is detected or when the touch of an attachment/detachment event icon for triggering an attachment/detachment event displayed on the display of the peripheral device 110 is detected, the peripheral device 110 may detect generation of an attachment event.

When the attachment event is detected, the peripheral device 110 may display a fingerprint recognition request screen and may recognize the user's fingerprint at operation 731, and transmit the recognized fingerprint information to the other electronic device B 104 at operation 733. At this time, since the peripheral device 110 cannot identify whether the event is an event for the attachment to the electronic device A 100 or an event for the attachment to the other electronic device B 104, the peripheral device 110 may broadcast fingerprint recognition information through the short-range wireless communication module such as BLE. According to an embodiment, after detecting neighboring other electronic device B 104 through the short-range wireless communication module, the peripheral device 110 may transmit fingerprint information to the detected other electronic device B 104.

When the fingerprint is received from the peripheral device 110, the other electronic device B 104 may perform a user authentication by using the received fingerprint information and a pre-acquired authentication key from the electronic device A 100 at operation 735. The other electronic device B 104 may transmit a result of the authentication to the peripheral device 110 at operation 737. The other electronic device B 104 may transmit the authentication result to the peripheral device 110 through the short-range wireless communication scheme such as BLE. The authentication result may include information on whether the user authentication is successful and/or the attachment of the peripheral device 110 is accepted. According to various embodiments, operation 737 may be omitted.

The other electronic device B 104 may determine a polarity for the attachment of the peripheral device 110 at operation 739. The other electronic device B 104 may determine at least one of a polarity of a magnetic force to be generated through at least one EPM included in the other electronic device B 104 and a polarity of a magnetic force to be generated through at least one EPM included in the peripheral device 110. Hereinafter, for convenience of the description, at least one EPM included in the other electronic device B 104 is referred to as a third EPM, and at least one EPM included in the peripheral device 110 is referred to as a second EPM. According to various embodiments, the other electronic device B 104 may determine polarities such that the second EPM and the third EPM generate magnetic forces of opposite polarities. Further, the other electronic device B 104 may determine a strength of the magnetic force for at least one of the third EPM and the second EPM. For example, in order to attach the peripheral device 110 with a strong force, the other electronic device B 104 may determine that the polarities of the second EPM and the third EPM are opposite, and determine that a strength of the magnetic force of at least one of the second EPM and the third EPM is larger than a threshold value. In another example, when the user authentication for the peripheral device 110 fails, in order to not attach the peripheral device 110 to the other electronic device B 104, the other electronic device B 104 may determine polarities such that the second EPM and the third EPM generate magnetic forces of the same polarity.

The other electronic device B 104 may transmit polarity information to the peripheral device 110 at operation 741. For example, the electronic device 100 may transmit information on one piece of polarity information of the second EPM, polarity information of the third EPM, magnetic force strength information of the second EPM, magnetic force strength information of the third EPM to the peripheral device 110. At this time, the other electronic device B 104 may transmit the polarity information to the peripheral device 110 through a short-range wireless communication scheme such as a BLE module.

The other electronic device B 104 may generate a magnetic force of a first polarity through the third EPM based on the determined polarity at operation 743. Further, the peripheral device 110 may generate a magnetic force of a second polarity through the second EPM based on the polarity information received from the other electronic device B 104 at operation 745. At this time, the first polarity of the third EPM and the second polarity of the second EPM may be opposite polarities having an attraction characteristic. Further, in order to attach the peripheral device 110 to the other electronic device B 104 with a storing force at operations 743 and 745, the second EPM and the third EPM may generate magnetic forces having the strength larger than a threshold value.

The other electronic device B 104 may transmit an attachment detection signal at operation 747. For example, after generating the magnetic force of the first polarity through the third EPM the other electronic device B 104 may periodically transmit the attachment detection signal through the data channel terminal included in the EPM module. Here, the attachment detection signal may be a signal for identifying whether the peripheral device 110 is attached to the other electronic device B 104.

When the attachment detection signal is received from the electronic device 100, the peripheral device 110 may recognize the attachment of the peripheral device 110 to the electronic device 100 at operation 749. For example, when the EPM module of the peripheral device 110 and the EPM module of the other electronic device B 104 contact each other, the attachment detection signal may be transferred to the peripheral device 110 from the other electronic device B 104 through the data channel terminal included in the EPM module of the peripheral device 110 and the data channel terminal included in the EPM module of the other electronic device B 104. Accordingly, when the attachment detection signal is received from the other electronic device B 104, the peripheral device 110 may recognize the attachment of the peripheral device 110 to the other electronic device B 104.

The peripheral device 110 may transmit an attachment detection response signal to the other electronic device B 104 at operation 751. For example, the peripheral device 110 may transmit the attachment detection response signal, which indicates the attachment of the peripheral device 110 to the other electronic device B 104, to the other electronic device B 104 through the data channel terminal included in the EPM module of the peripheral device 110. When the attachment detection response signal is received from the peripheral device 110, the other electronic device B 104 may recognize the state where the peripheral device 110 is attached to the other electronic device B 104 at operation 753. The other electronic device B 104 may store information indicating the state where the peripheral device 110 is attached to the other electronic device B 104. Here, before a detachment event is generated, the other electronic device B 104 and the peripheral device 110 maintain polarities and strengths of the magnetic forces of the first EPM and the second EPM.

Thereafter, the peripheral device 110 may detect a data transmission event to the other electronic device B 104 at operation 755. The peripheral device 110 may detect generation of the data transmission event by a user's gesture, a key button input, or a touch detection. For example, as illustrated in FIG. 8, when a drag in a direction in a location of the other electronic device B 104 is detected in a predetermined area of the touch screen in a state where the peripheral device 110 is attached to the other electronic device B 104, the peripheral device 110 may detect the generation of the data transmission event to the other electronic device B 104. The peripheral device 110 having detected the data transmission event may transmit data selected by the user to the other electronic device B 104 at operation 757. According to an embodiment, the peripheral device 110 may transmit contents currently displayed on the touch screen (for example, image files, music files, video files, and various types of document files) to the other electronic device B 104. According to an embodiment, the peripheral device 110 may transmit contents at a location where the user touch is generated on the current touch screen to the other electronic device B 104. In another example, the peripheral device 110 may transmit, to the other electronic device B 104, data received from the electronic device A 100 before being attached to the other electronic device B 104. In another example, the peripheral device 110 may capture an image displayed on the current touch screen and transmit the captured image to the other electronic device B 104. At this time, the peripheral device 110 may transmit data to the other electronic device B 104 through the data channel terminal of the EPM module of the peripheral device 110 or transmit data to the other electronic device B 104 through the short-range wireless communication module such as BLE.

When data is received from the peripheral device 110, the other electronic device B 104 informs the user that the data has been received and stores the received data at operation 759. For example, the other electronic device B 104 may display a message or a graphic element (for example, icon) indicating that the data is being received from the peripheral device 110 or display a message or a graphic element indicating that the reception of the data from the peripheral device 110 has been completed. According to an embodiment, the other electronic device B 104 may output a voice signal or generate a vibration indicating that the reception of the data from the peripheral device 110 has been completed.

FIG. 9A illustrates a charging process of the electronic device and the peripheral device according to an embodiment of the present disclosure. Here, it is assumed that the peripheral device 110 is attached to the electronic device 100.

Referring to FIG. 9A, the electronic device 100 determines a power amount of the current electronic device 100 at operation 901. For example, the electronic device 100 may measure a residual power amount of the battery of the electronic device 100.

Thereafter, the electronic device 100 may inspect whether the power amount of the electronic device 100 is smaller than or equal to a threshold value at operation 903. When the power amount of the electronic device 100 is smaller than or equal to the threshold value, the electronic device 100 may inspect whether the electronic device is currently charged at operation 905. For example, in a state where the residual power amount is smaller than or equal to the threshold value, the electronic device 100 may inspect whether a charging function is performed through a supply of a charging current from an external charging device. When the electronic device 100 is currently charged, the electronic device 100 may provide the charging current to the peripheral device 110 at operation 907. The electronic device 100 may output the charging current of the electronic device 100 or the charging current from the external charging device to the peripheral device 110. At this time, the peripheral device 110 may perform the charging function based on the charging current provided from the electronic device 100. Here, the charging current may be transferred through the power terminal included in the EPM module of each of the electronic device 100 and the peripheral device 110. According to an embodiment, when the residual power amount of the battery of the peripheral device 110 is larger than or equal to the threshold value, the electronic device 100 may stop supplying the charging current to the peripheral device 110. According to an embodiment, the electronic device 100 may supply the charging current to the peripheral device 110 while the supply of the charging current from the external charging device is maintained and, when the supply of the charging current from the external charging device is stopped, may stop supplying the charging current to the peripheral device 110. According to an embodiment, the electronic device 100 may continuously supply the charging current to the peripheral device 110 until there is a request for stopping the charging from the user.

When the electronic device 100 is not currently charged, the electronic device 100 proceeds to at operation 911 and may inspect whether the power amount of the peripheral device 110 is smaller than or equal to the threshold value. The electronic device 100 may make a request for information on the residual power amount to the peripheral device 110 and receive the information on the residual power amount from the peripheral device 110. At this time, each of the electronic device 100 and the peripheral device 110 may transmit and receive the information on the residual power amount through the data channel terminal included in the EPM module or the BLE module. When the power amount of the peripheral device 110 is smaller than or equal to the threshold value, the electronic device 100 may proceed to at operation 921, described below.

When the power amount of the peripheral device 110 is larger than the threshold value, the electronic device 100 makes a request for the charging current to the peripheral device 110 at operation 913 and receives the charging current from the peripheral device 110 to perform the charging at operation 915. For example, in a state where the electronic device 100 is not charged, when the residual power amount of the electronic device 100 is smaller than or equal to the threshold value and the residual power amount of the peripheral device 110 is larger than the threshold value, the electronic device 100 may charge the battery of the electronic device 100 by using the residual power amount of the peripheral device 110. According to an embodiment, when the residual power amount of the battery becomes larger than or equal to the threshold value, the electronic device 100 may stop the charging function by making a request for stopping the supply of the charging current to the peripheral device 110. According to an embodiment, the electronic device 100 may determine a charging power amount of the electronic device 100 based on the residual power amount of the peripheral device 110 and, when the charging is performed by the charging power amount, may stop the charging function by making a request for stopping the supply of the charging current to the peripheral device 110.

Meanwhile, when the power amount of the electronic device is larger than the threshold value based on a result of the inspection of operation 903, the electronic device 100 may inspect whether a user input is detected at operation 921. For example, when the power amount of the electronic device 100 is smaller than or equal to the threshold value, or when the power amount of the electronic device 100 is smaller than or equal to the threshold value and the power amount of the peripheral device 110 is smaller than the threshold value, the electronic device 100 may inspect whether a user input for controlling the charging function is received.

When the user input is detected, the electronic device 100 may select a device to be charged based on the user input at operation 923, and inspect whether a device to be charged is the electronic device 100 or the peripheral device 110 at operation 925. For example, the electronic device 100 may select the device to be charged, by detecting a user's gesture, a touch input by the user, or a key button press by the user.

FIG. 9B illustrates an example of a charging scheme of the electronic device and the peripheral device according to an embodiment of the present disclosure;

Referring to FIG. 9B, when a drag in a direction of the peripheral device 110 in a predetermined area is input by the user, the peripheral device 110 may be selected as the device to be charged. In another example, although not illustrated, when a drag in an opposite direction of the peripheral device 110 in a predetermined area is input by the user, the electronic device 100 may be selected as the device to be charged.

When the device to be charged is the peripheral device 110, the electronic device 100 may provide the charging current to the peripheral device 110 at operation 927. For example, the electronic device 100 may output the charging current to the peripheral device 110 by using residual power of the electronic device 100. At this time, the peripheral device 110 may perform the charging function based on the charging current provided from the electronic device 100. Here, the charging current may be transferred through the power terminal included in the EPM module of each of the electronic device 100 and the peripheral device 110. According to an embodiment, when the residual power amount of the battery of the peripheral device 110 is larger than or equal to the threshold value, the electronic device 100 may stop supplying the charging current to the peripheral device 110. According to an embodiment, the electronic device 100 may determine a charging power amount of the peripheral device 110 based on the residual power amount of the electronic device 100 and, when the peripheral device 110 is charged by the charging power amount, may stop supplying the charging current to the peripheral device 110. According to an embodiment, the electronic device 100 may continuously supply the charging current to the peripheral device 110 until there is a request for stopping the charging from the user.

When the device to be charged is the electronic device 100, the electronic device 100 makes a request for the charging current to the peripheral device 110 at operation 913, and receives the charging current from the peripheral device 110 and performs the charging at operation 915. For example, the electronic device 100 may charge the battery of the electronic device 100 by using the residual power amount of the peripheral device 110 according to a user's control. According to an embodiment, when the residual power amount of the battery becomes larger than or equal to the threshold value, the electronic device 100 may stop the charging function by making a request for stopping the supply of the charging current to the peripheral device 110. According to an embodiment, the electronic device 100 may determine a charging power amount of the electronic device 100 based on the residual power amount of the peripheral device 110 and, when the charging is performed by the charging power amount, may stop the charging function by making a request for stopping the supply of the charging current to the peripheral device 110. According to an embodiment, the electronic device 100 may perform the charging function by continuously receiving the charging current from the peripheral device 110 until there is a request for stopping the charging from the user.

The electronic device 100 may end the process according to an embodiment of the present disclosure.

As described above, the electronic device 100 and the peripheral device 110 may perform the charging function according to a user's control and/or a preset rule in a state where the peripheral device 110 is attached to the electronic device 100. The rule illustrated in FIG. 9A is only an example, and embodiments of the present disclosure are not limited thereto.

Figure 10:
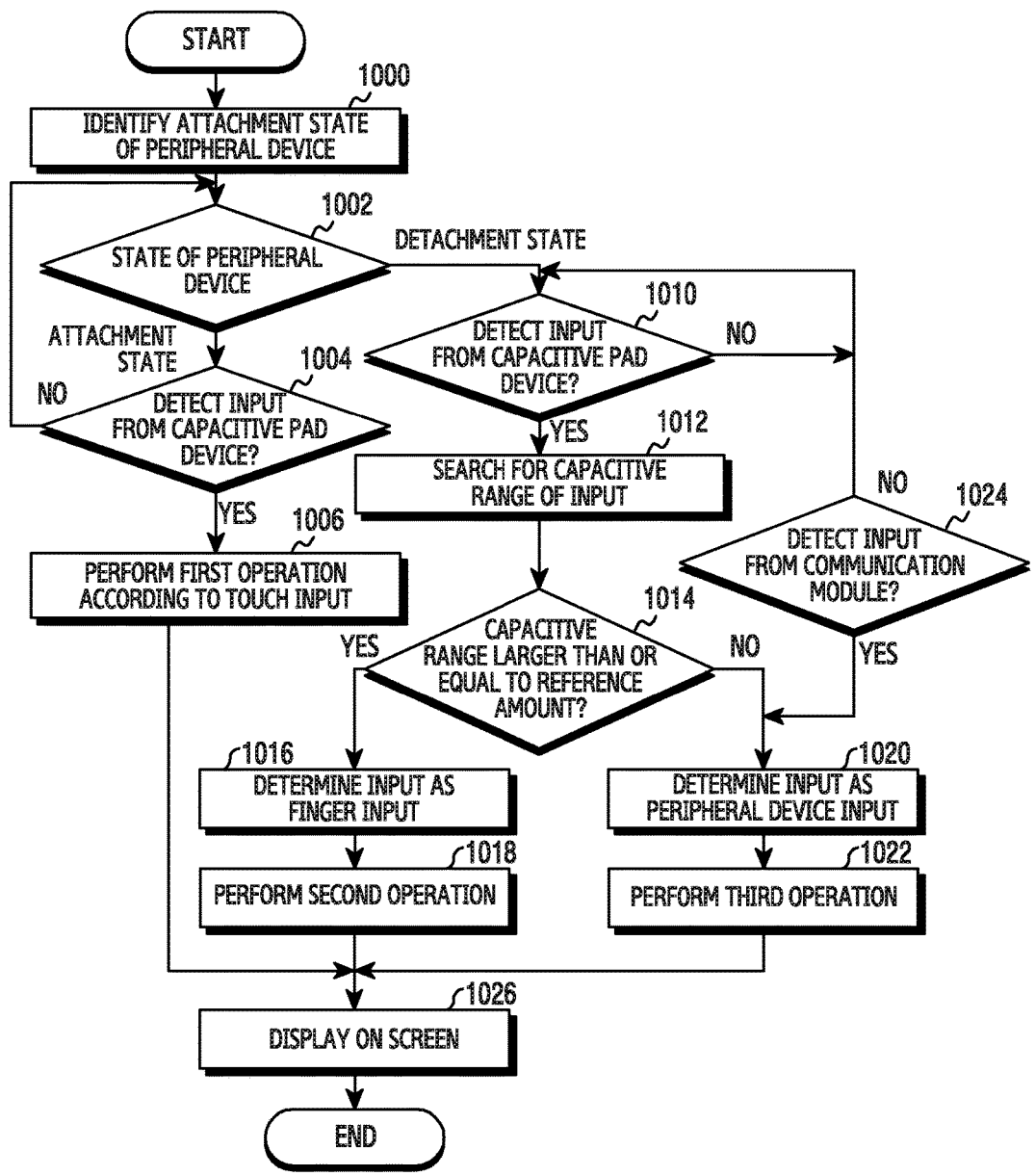
FIG. 10 illustrates a process in which an electronic device performs an operation corresponding to a touch based on an attachment/detachment state of a peripheral device according to an embodiment of the present disclosure.

FIG. 10 illustrates a process in which the electronic device performs an operation corresponding to a touch based on an attachment/detachment state of the peripheral device according to an embodiment of the present disclosure. Here, it is assumed that the electronic device 100 includes a capacitive touch pad (hereinafter, referred to as a "capacitive pad" for convenience of the description).

Referring to FIG. 10, the electronic device 100 may identify an attachment state of the peripheral device at operation 1000. For example, the electronic device 100 may store the attachment state of the peripheral device whenever the peripheral device 110 is attached to or detached from the electronic device 100, and may identify whether the peripheral device 110 is attached to the electronic device 100 based on the stored information.

The electronic device 100 may determine whether the peripheral device 110 is in the attachment state or the detachment state based on a result of the identification of the attachment state of the peripheral device 110 at operation 1002. When the peripheral device 110 is in the attachment state, the electronic device 100 may inspect whether an input is detected from a capacitive pad device at operation 1004. When the input from the capacitive pad device is not detected, the electronic device 100 may inspect the state of the peripheral device 110 and inspect whether the state of the peripheral device 110 is changed at operation 1002.

When the input from the capacitive pad device is detected, the electronic device 100 performs a first operation according to a touch input at operation 1006. At this time, the first operation may vary depending on an application being executed.

FIGS. 11A to 11C, illustrate an example of an operation corresponding to a touch based on an attachment/detachment state between the electronic device and the peripheral device according to an embodiment of the present disclosure;

Referring to FIGS. 10 and 11A, when a touch input is generated in a state where the peripheral device 110 is attached to the electronic device 100, the electronic device 100 may determine the touch input as a touch using a user's finger and perform the first operation corresponding to the attachment state of the peripheral device 110 and the user's finger input among operations corresponding to the application being executed. The electronic device 100 may display various pieces of data, state information, graphic elements, and graphic changes that are generated according to the performance of the first operation on the screen at operation 1026. For example, in a memo application, the first operation may be a "pen drawing" operation. At this time, the electronic device 100 may display a mark drawn by a pen at a location where the finger touch is detected and input onto the screen. In another example, in a webpage application, the first operation may be a "screen movement" operation. At this time, the electronic device may move and display the screen according to the finger touch operation.

Meanwhile, when the peripheral device 110 is in the detachment state, the electronic device 100 may inspect whether the input is detected from the capacitive pad device at operation 1010. When the input is detected from the capacitive pad device, the electronic device 100 may search for a capacitive range of the input at operation 1012. For example, the electronic device 100 may measure a constant voltage range input from the capacitive pad device. The electronic device 100 may determine whether the capacitive range is larger than or equal to a predetermined reference amount at operation 1014.

When the capacitive range is larger than or equal to the predetermined reference amount, the electronic device 100 may determine that the input for the capacitive pad is the input by the finger at operation 1016 and perform a second operation at operation 1018.

Referring to FIGS. 10 and 11B, when a touch input having a large change in the constant voltage range is generated in a state where the peripheral device 110 is not attached to the electronic device 100, the electronic device 100 may determine the touch input as the touch using the user's finger and perform a second operation corresponding to the detachment state of the peripheral device 110 and the finger input among operations corresponding to the application being executed. The electronic device 100 may display various pieces of data, state information, graphic elements, and graphic changes that are generated according to the performance of the second operation on the screen at operation 1026. For example, in a memo application, the second operation may be a "deletion" operation. At this time, the electronic device 100 may delete graphic elements displayed at a location where the finger touch is detected and input onto the screen. In another example, in a webpage application, the second operation may be a "screen enlargement or reduction" operation. At this time, the electronic device 100 may enlarge or reduce a size of the screen and display the screen according to a finger touch direction, a touch maintaining time, or a movement distance.

Further, when the capacitive range is smaller than the predetermined reference amount, the electronic device 100 may determine that the input for the capacitive pad is the input by the peripheral device 110 at operation 1020 and perform a third operation at operation 1022.

Referring to FIGS. 10 and 11C, when a touch input having a small change in the constant voltage range is generated in a state where the peripheral device 110 is not attached to the electronic device 100, the electronic device 100 may determine the touch input as the touch using the peripheral device 110 and perform a third operation corresponding to the detachment state of the peripheral device 110 and the input of the peripheral device 110 among operations corresponding to the application being executed. The electronic device 100 may display various pieces of data, state information, graphic elements, and graphic changes that are generated according to the performance of the third operation on the screen at operation 1026. For example, in a memo application, the third operation may be an "enlargement or reduction" operation. At this time, the electronic device 100 may enlarge or reduce the memo pad according to a screen touch movement distance, a touch maintaining time, or a touch direction by the peripheral device 110. In another example, in a webpage application, the third operation may be a "selection" operation. At this time, the electronic device 100 may select an item at a location where the touch by the peripheral device 110 is generated.

Meanwhile, when the input from the capacitive pad is not detected based on a result of the inspection of operation 1010, the electronic device 100 may inspect whether the input is detected from the communication module at operation 1024. For example, the electronic device 100 may inspect whether the input is detected through a communication scheme such as BLE from the peripheral device 110 in a state where the peripheral device 110 is not attached to the electronic device 100. When the input is not detected from the communication module, the electronic device 100 returns to operation 1010 and re-performs the operations following operation 1010.

When the input is detected from the communication module, the electronic device 100 may determine that the input from the communication module is an input by the peripheral device 110 at operation 1020 and perform a third operation at operation 1022. For example, when the electronic device 100 receives a signal including identification information of the peripheral device 110 through the BLE module in a state where the peripheral device 110 is not attached to the electronic device 100, the electronic device 100 may determine the signal as an input using the peripheral device 110 and perform a third operation corresponding to the detachment state of the peripheral device 110 and the peripheral device 110 among operations corresponding to the application being executed. The electronic device 100 may display various pieces of data, state information, graphic elements, and graphic changes that are generated according to the performance of the third operation on the screen at operation 1026. For example, in a memo application, the third operation may be an "enlargement or reduction" operation. At this time, the electronic device 100 may enlarge or reduce a memo pad according to the input signal by the peripheral device 110. In another example, in a webpage application, the third operation may be a "selection" operation. At this time, the electronic device 100 may select one item included in the webpage according to the input signal by the peripheral device 110.

In FIG. 10 described above, when the input is detected from the communication module, the electronic device 100 may perform a fourth operation corresponding to the detachment state of the peripheral device 110 and the communication input of the peripheral device 110 rather than the third operation among the operations corresponding to the application being executed. That is, it is apparent that the electronic device 100 may perform different operations when the input of the peripheral device 110 is the input through the capacitive pad and the input is the input through the communication module.

In FIGS. 10, 11A, 11B, and 11C described above, the operations of the applications are only examples and the present disclosure is not limited thereto.

Further, the above description has been made based on an example in which the electronic device 100 performs different operations when the finger touch input is generated in the state where the peripheral device 110 is attached to the electronic device 100 and when the finger touch input is generated in the state where the peripheral device 110 is not attached to the electronic device 100. However, according to a design type, the electronic device 100 may perform the same operation when the finger touch input is generated in the state where the peripheral device 110 is attached to the electronic device 100 and when the finger touch input is generated in the state where the peripheral device 110 is not attached to the electronic device 100.

Further, as illustrated in FIGS. 10, 11A, 11B, and 11C, in the present disclosure, various operations may be performed according to whether the peripheral device 110 is attached to the electronic device 100 and the input type (for example, touch input by the finger, touch input by the peripheral device, and communication input by the peripheral device). Accordingly, the user can more freely control the electronic device 100 through the peripheral device 110 and the finger. For example, in a state where the electronic device 100 executes the memo application, the user may delete a drawing using a finger while making the drawing on the screen of the electronic device 100 through the peripheral device 110. In another example, in a state where the webpage is displayed in the electronic device 100, the user may reduce or enlarge the webpage screen using a finger while switching the webpage screen through the peripheral device 110.

Figure 12A:
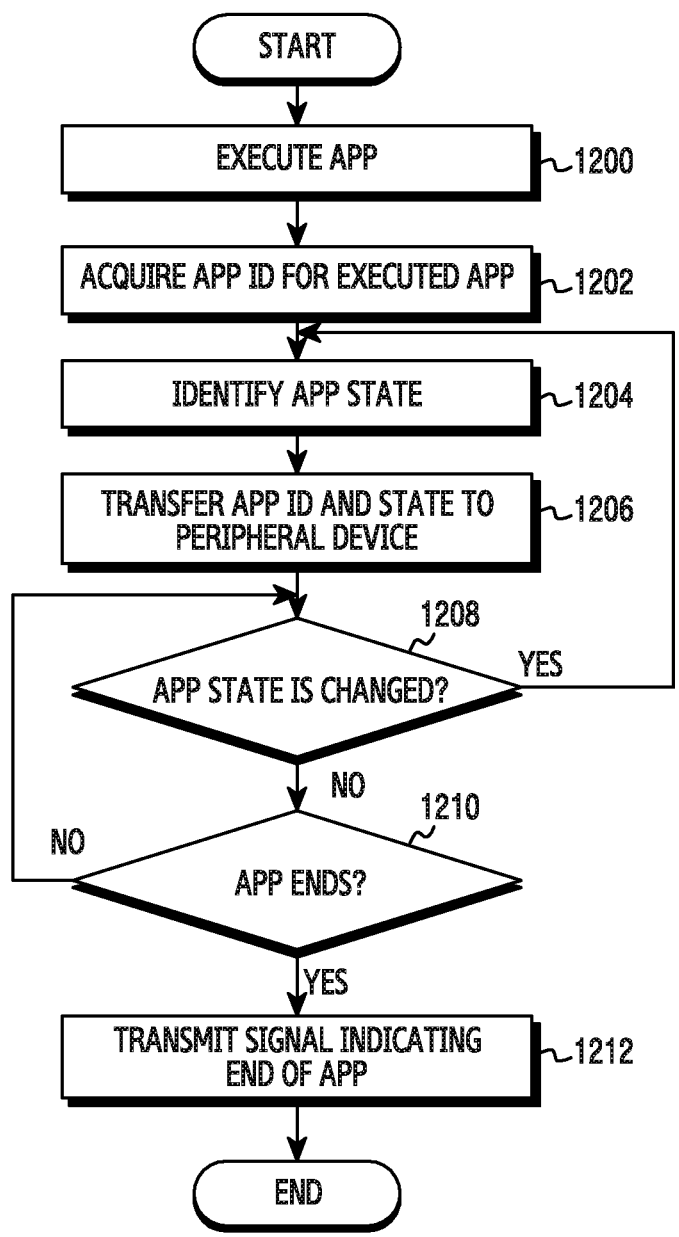
FIG. 12A illustrates an operation process based on an application being executed in an electronic device according to an embodiment of the present disclosure.

FIG. 12A illustrates an operation process according to an application being executed in the electronic device according to an embodiment of the present disclosure. Here, the application is referred to as an "app" for convenience of the description.

Referring to FIG. 12A, the electronic device 100 may execute the app at operation 1200, acquire identification information (for example, ID) of the executed app at operation 1202, and identify a state of the app at operation 1204. Here, the state of the app may indicate a displayed screen, and/or an operation state or an operation mode. For example, the operation state or the operation mode may indicate various operation modes such as an input mode of the corresponding app, an output mode, a photographing mode, a reproduction mode, a notification mode, and a game mode. Further, the input mode may be divided into a touch input mode, a text input mode, and a voice input mode. For example, the electronic device 100 may identify that the state of the executed camera app corresponds to a picture photographing mode, a video photographing mode, a preview mode, or a photographed image display mode. In another example, the electronic device 100 may identify whether the state of the executed web browser app corresponds to a touch input mode or a text input mode. In another example, the electronic device 100 may identify whether a state of the executed loudspeaker app corresponds to a voice signal input mode or a voice signal amplification mode.

The electronic device 100 may transmit identification information and state information of the executed app to the peripheral device 110 at operation 1206. For example, the electronic device 100 may transmit a signal indicating that the camera app is executed and the current state corresponds to the preview mode to the peripheral device 110. Here, the app identification information and the state information may be transmitted to the peripheral device 110 through the data channel terminal included in the EPM module of the electronic device 100 or the communication module such as BLE. For example, when the peripheral device 110 is attached to the electronic device 100, the electronic device 100 may transmit app identification information and state information to the peripheral device 110 through the data channel terminal included in the EPM module of the electronic device 100. In another example, when the peripheral device 110 is not attached to the electronic device 100, the electronic device 100 may transmit app identification information and state information to the peripheral device 110 through the communication module such as BLE. According to an embodiment, the electronic device 100 may transmit only the app identification information at an app execution starting time point. Further, when the executed app corresponds to an app that operates only in one state, the electronic device 100 may transmit only the app identification information.

Thereafter, the electronic device 100 may inspect whether the state of the app is changed, at operation 1208. For example, in a state where the camera app is executed, the electronic device 100 may inspect whether a mode of the camera app is changed from the picture photographing mode to the video photographing mode or from the preview mode to the photographed image display mode. In another example, in a state where the web browser app is executed, the electronic device 100 may inspect whether a mode of the web browser is changed from the touch input mode to the text input mode. In another example, in a state where the loudspeaker app is executed, the electronic device 100 may inspect whether a mode of the loudspeaker app is changed from the voice signal input mode to the voice signal amplification mode. When the state of the app is changed, the electronic device 100 may return to operation 1204 and transmit information on the changed state of the app to the peripheral device 110.

When the state of the app is not changed, the electronic device 100 may proceed to operation 1210 and inspect whether the executed app ends. When the executed app does not end, the electronic device 100 returns to operation 1208 and may inspect whether the state of the app is changed.

When the executed app ends, the electronic device 100 may transmit a signal indicating that the app ends to the peripheral device 110 at operation 1212. At this time, the signal indicating that the app ends may include app identification information. Further, the signal indicating that the app ends may include state information indicating the end of the app.

Thereafter, the electronic device 100 may terminate the process according to an embodiment of the present disclosure.

Figure 12B:
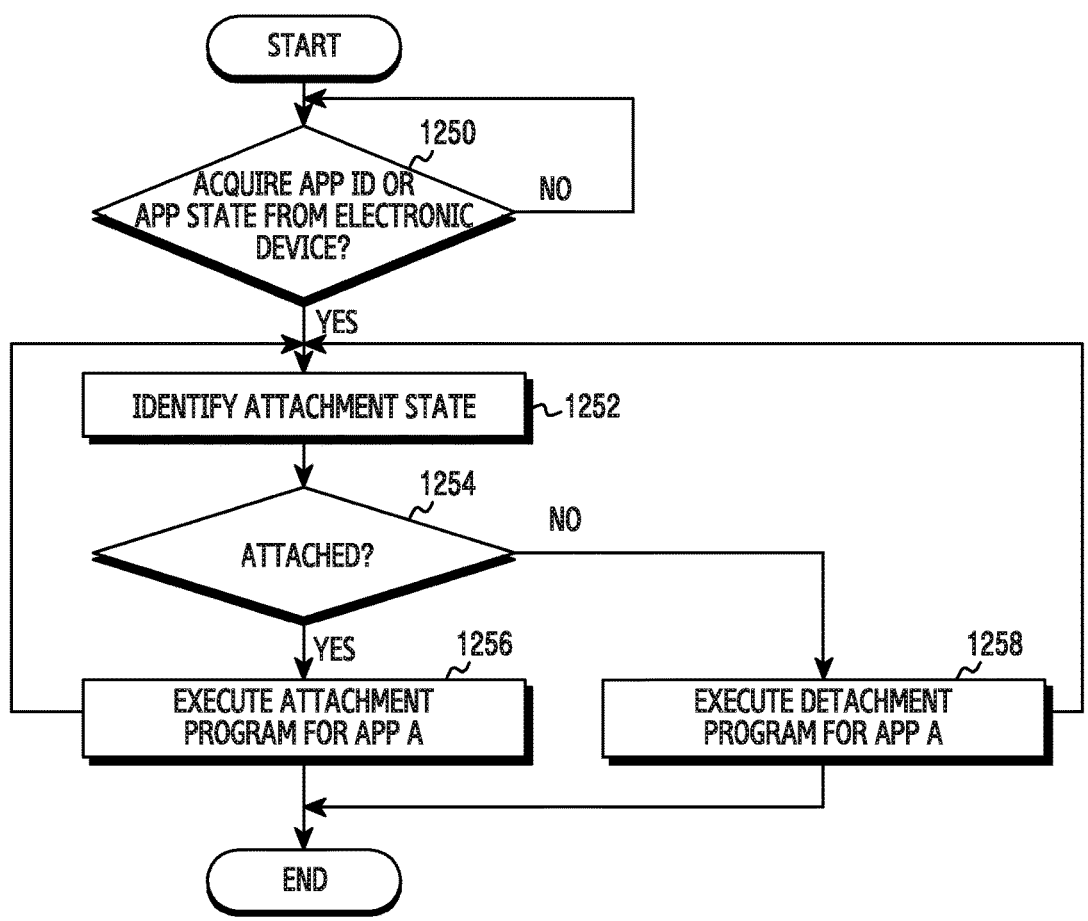
FIG. 12B illustrates an operation process of a peripheral device based on an executed application of an electronic device according to an embodiment of the present disclosure.

FIG. 12B illustrates an operation process of the peripheral device based on an executed application of the electronic device according to an embodiment of the present disclosure. Here, the application is referred to as an "app" for convenience of the description.

Referring to FIG. 12B, the peripheral device 110 may inspect whether app identification information or app state information is acquired from the electronic device 100 at operation 1250. For example, the peripheral device 110 may inspect whether the app identification information and/or the app state information are acquired from the electronic device 100 through the data channel terminal of the EPM module or the communication module such as BLE.

When the app identification information or the app state information are acquired, the peripheral device 110 may identify an attachment state of the peripheral device 110 to the electronic device 100, at operation 1252, and determine whether the peripheral device 110 is attached to the electronic device 100 at operation 1254 based on the identification of operation 1252. The peripheral device 110 may acquire information indicating whether the peripheral device 110 is attached to the electronic device 100 from the memory and identify whether the peripheral device 110 is attached to the electronic device 100.

When the peripheral device 110 is attached to the electronic device 100, the peripheral device 110 may execute an attachment program for app A corresponding to the app identification information at operation 1256. When the peripheral device 110 is not attached to the electronic device 100, the peripheral device 110 may execute a detachment program for app A corresponding to the app identification information at operation 1258. For example, the peripheral device 110 may store an operation program of the peripheral device 110 or operation mode information according to the attachment state with respect to a plurality of apps which can be executed in the electronic device 100. For example, with respect to app A which can be executed in the electronic device 100, the peripheral device 110 may store information indicating that a program corresponding to the attachment state is a first program and a program corresponding to the detachment state is a second program. Here, the program means to include an app.

For example, when information indicating "application identification information: camera application ID and application state information: preview mode" is received from the electronic device 100 in a state where the peripheral device 110 is attached to the electronic device 100, the peripheral device 110 may execute a camera menu mode and display menu buttons for setting a camera photographing environment on the screen.

FIGS. 13A to 13C illustrate an example of an operation of the peripheral device based on an application being executed in the electronic device according to an embodiment of the present disclosure.

Referring to FIG. 13A, when information indicating "application identification information: camera application ID and application state information: preview mode" is received from the electronic device 100 in a state where the peripheral device 110 is not attached to the electronic device 100, the peripheral device 110 may execute a camera remote control mode and display a shutter button for the photographing on the screen. At this time, when a shutter button selection by the user is detected, the peripheral device 110 may transfer a photographing command signal to the electronic device 100.

Referring to FIG. 13B, when information indicating "application identification information: web browser application ID and application state information: webpage display mode" is received from the electronic device 100 in a state where the peripheral device 110 is not attached to the electronic device 100, the peripheral device 110 may execute a webpage control mode and display a scroll bar. At this time, when a scroll bar is moved by the user, the processor 420 may transmit a signal indicating a movement of the scroll bar to the electronic device 100.

Referring to FIG. 13C, when information indicating "application identification information: loudspeaker application ID and application state information: voice signal input mode" is received from the electronic device 100 in a state where the peripheral device 110 is not attached to the electronic device 100, the peripheral device 110 may execute a microphone mode and display a voice signal input request message.

When the electronic device 100 transmits at least one piece of the application identification information and the state information to the peripheral device 110, FIGS. 12A, 12B, 13A, 13B, and 13C have described the determination of the execution operation of the peripheral device 110 based on whether the peripheral device 110 is attached to the electronic device 100 and the received app identification information and state information. However, according to various embodiments, the electronic device 100 may determine the operation to be executed in the peripheral device 110 in consideration of whether the peripheral device 110 is attached to the electronic device 100 and at least one piece of the app identification information and the state information and then transmit information on the determined operation.

Figure 14A:
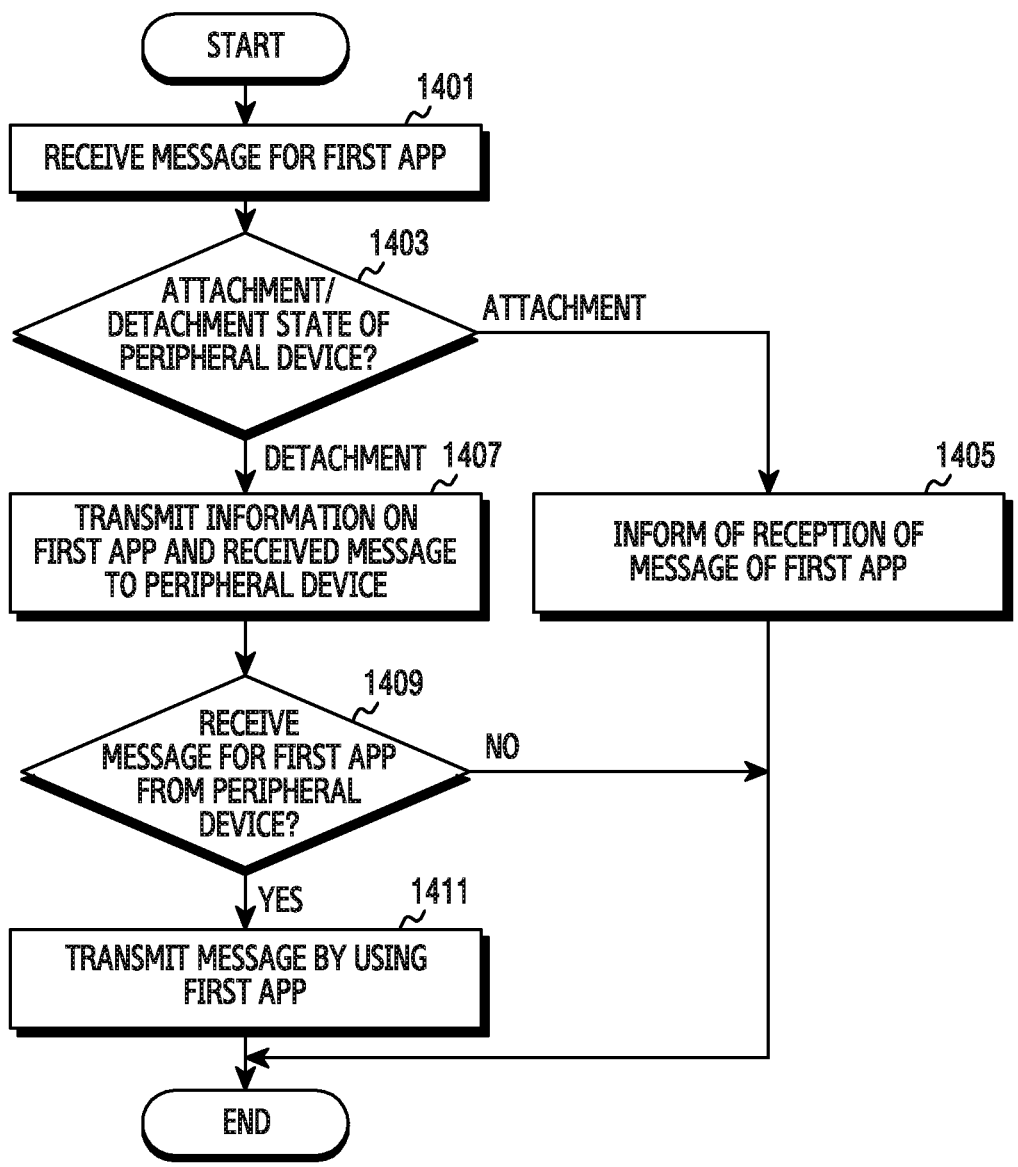
FIG. 14A illustrates a message transmission/reception process of an electronic device based on an attachment/detachment state of a peripheral device according to an embodiment of the present disclosure.

FIG. 14A illustrates a message transmission/reception process of the electronic device based on an attachment/detachment state of the peripheral device according to an embodiment of the present disclosure. Here, the application is referred to as an "app" for convenience of the description.

Referring to FIG. 14A, the electronic device 100 may receive a message for a first app at operation 1401. For example, the electronic device 100 may include a social network service (SNS) message app, a text message app, and an electronic mail app. The electronic device 100 may identify an attachment/detachment state of the peripheral device 110 at operation 1403. The electronic device 100 may acquire information indicating whether the peripheral device 110 is attached to the electronic device 100 from the memory and identify whether the peripheral device 110 is attached to or detached from the electronic device 100. When the peripheral device 110 is attached to the electronic device 100, the electronic device 100 may inform of reception of the message of the first app at operation 1405 and terminate the process according to an embodiment of the present disclosure. For example, the electronic device 100 may display a graphic element that informs of the reception of the message on the display of the electronic device 100 by using the first app.

When the peripheral device 110 is detached from the electronic device 100, the electronic device 100 may transmit information on the first app and the received message to the peripheral device 110 at operation 1407. For example, the electronic device 100 may transmit identification information of the first app and the received message of the first app including transmission electronic device information to the peripheral device 110.

The electronic device 100 may inspect whether the message for the first app is received from the peripheral device 110 at operation 1409. When the message for the first app is not received from the peripheral device 110, the electronic device 100 may terminate the process according to an embodiment of the present disclosure. When the message for the first app is received from the peripheral device 110, the electronic device 100 may transmit the message by using the first app at operation 1411. For example, the electronic device 100 may receive a reply message from the peripheral device 110 in response to the received message at operation 1401. The reply message may include information on a reception electronic device to receive the identification information of the first app and the reply message. Accordingly, the electronic device 100 may transmit the reply message to the reception electronic device by using the first app. At this time, the electronic device 100 may display a screen indicating that the reply message has been transmitted or may not display any information on the screen. For example, when the reply message is received from the peripheral device 110 in a state where the screen of the electronic device 100 is turned off, the electronic device 100 may not display any information related to transmission of the reply message on the screen. However, the electronic device 100 may additionally record information indicating the transmission of the reply message in message transmission/reception log information of the first app and store the record.

Thereafter, the electronic device 100 may terminate the process according to an embodiment of the present disclosure.

Figure 14B:
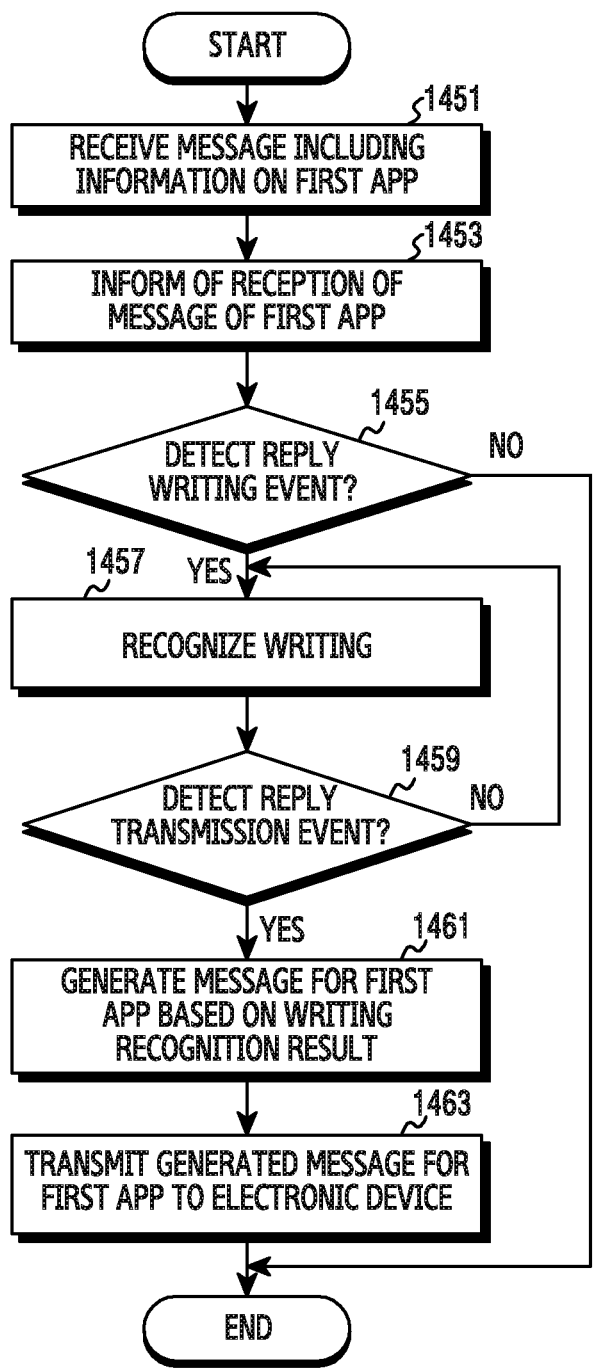
FIG. 14B illustrates a message transmission/reception process in a peripheral device according to an embodiment of the present disclosure.

FIG. 14B illustrates a message transmission/reception process in the peripheral device according to an embodiment of the present disclosure. Here, the application is referred to as an "app" for convenience of the description.

Referring to FIG. 14B, the peripheral device 110 may receive a message including information on a first app at operation 1451. For example, the first app may be one of an SNS message app, a text message app, and an electronic mail app. Further, the message including the information on the first app may include identification information of the first app, an incoming message received by the electronic device 100 through the first app from the transmission electronic device, and information of the transmission electronic device having transmitted the incoming call (for example, outgoing call number or a sender name).

The peripheral device 110 may inform of reception of the message of the first app at operation 1453. For example, the peripheral device 110 may display message contents of the incoming call received by the electronic device 100 through the first app and transmission electronic device information. At this time, the display may be performed with a graphic element indicating the first app.

The peripheral device 110 may inspect whether a reply writing event is generated at operation 1455. The peripheral device 110 may detect generation of the reply writing event by a press of at least one key included in the peripheral device 110 or a touch detection on the display. When the generation of the reply writing event is not detected, the peripheral device 110 may terminate the process according to an embodiment of the present disclosure.

When the generation of the reply writing event is detected, the peripheral device 110 may recognize the writing at operation 1457. For example, the peripheral device 110 may recognize the writing by detecting a motion of the peripheral device 110 based on at least one sensor such as a gyro sensor. According to an embodiment, the peripheral device 110 may display a result of the writing recognition on the display of the peripheral device 110. At this time, the peripheral device 110 may display a writing recognition result message by using the first app.

Figure 15:
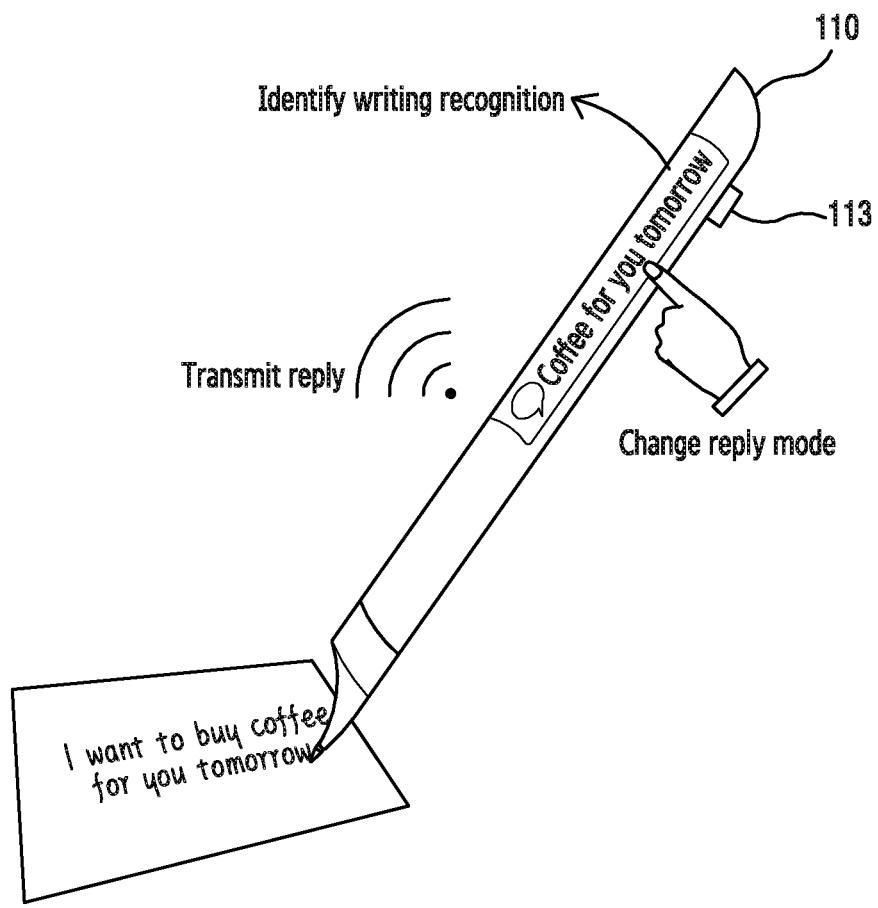
FIG. 15 illustrates a message transmission/reception scheme of a peripheral device according to an embodiment of the present disclosure.

FIG. 15 illustrates a message transmission/reception scheme of the peripheral device according to an embodiment of the present disclosure.

Referring to FIGS. 14B and 15, when the at least one key button 113 is pressed, the peripheral device 110 may determine that the reply writing event is generated and recognize contents written by a ball-point pen part of the peripheral device 110. The peripheral device 110 may display the recognized contents written along with an icon of the corresponding app so as to allow the user to identify whether the writing recognition is accurately performed in the peripheral device 110.

The peripheral device 110 may inspect whether a reply transmission event is generated at operation 1459. The peripheral device 110 may detect the generation of the reply transmission event by a press of at least one key button included in the peripheral device 110 or a touch detection on the display. When the generation of the reply transmission event is not detected, the peripheral device 110 may continuously recognize the writing at operation 1457. According to various embodiments, the key button for triggering the reply writing event and the key button for triggering the reply transmission event may be the same as each other or may be different from each other. According to an embodiment, when the key button for triggering the reply writing event and the key button for triggering the reply transmission event are the same, the peripheral device 110 may detect the generation of the reply writing event if the corresponding key button is pressed once and may detect the reply transmission event if the corresponding key button is pressed again. In another example, the peripheral device 110 may detect the generation of the reply writing event when the corresponding key button is pressed once and may detect the generation of the reply transmission event when the press of the corresponding key button is released. At this time, the peripheral device 110 may recognize the writing while the pressed state of the corresponding key button is maintained and generate a message.

When the generation of the reply transmission event is detected, the peripheral device 110 may generate a message for the first app based on a result of the writing recognition at operation 1461. For example, the peripheral device 110 may generate a reply message of the first app including contents of the reply message generated according to the result of the writing recognition. A first reply message may include text acquired by the writing recognition (for example, letter, number, and symbol), images, identification information of the first app, and/or information on the reception electronic device to receive the corresponding message (for example, incoming call number and an incoming call user name).

Thereafter, the peripheral device 110 may transmit the generated message for the first app to the electronic device 100 at operation 1463. Accordingly, the peripheral device 110 terminates the process according to an embodiment of the present disclosure.

According to FIGS. 14A, 14B, and 15 described above, the user may write the reply message of the incoming message of a particular app by using the peripheral device 110 detached from the electronic device 100 and transmit the written message to the electronic device 100 by using the peripheral device 110. Accordingly, the corresponding reply message may be transmitted to the reception electronic device through the electronic device 100.

In embodiments of the present disclosure, it is assumed that the electronic device 100 and the peripheral device 110 can be detached from each other through the EPM. However, various embodiments of the above described embodiments may be equally performed even when the electronic device 100 and the peripheral device 110 are not detached from each other through the EPM. For example, various embodiments of the present disclosure may be applied in the same way even when the peripheral device 110 is attached to and detached from the electronic device 100 through a different scheme.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more kernel threads within the electronic device. The at least one program may include instructions that cause the electronic device to perform the methods according to various embodiments of the present disclosure as defined by the appended claims and/or disclosed herein.

While the present disclosure has been shown and described with reference to various embodiments thereof, it will be understood by those skilled in the art that various changes in form and details may be made therein without departing from the spirit and scope of the present disclosure defined as by the appended claims and their equivalents.

The invention claimed is:

1. An electronic device comprising:
a first electromagnet whose polarity and strength of magnetic force are controllable, and which is mounted to a side surface of the electronic device;
a transceiver configured to receive, from a peripheral device, a request signal for controlling the polarity and the strength of the magnetic force of the first electromagnet, the request signal comprising information on a first magnetic force having a first polarity and a first strength; and
at least one processor configured to:
control the first electromagnet to generate the first magnetic force according to the first polarity and the first strength of the information, and
transmit, to the peripheral device, a detection signal to detect an attachment or detachment between the electronic device and the peripheral device, caused by the generated first magnetic force according to the first polarity and the first strength of the information.

2. The electronic device of claim 1, wherein the at least one processor is further configured to:
detect an event for the attachment or the detachment between the electronic device and the peripheral device,
according to the event, determine a second strength and a second polarity of a second magnetic force for the peripheral device, and
transmit the determined second strength and the determined second polarity of the second magnetic force for the peripheral device.

3. The electronic device of claim 1, wherein the at least one processor is further configured to:
detect an event for the attachment or the detachment between the electronic device and the peripheral device,
receive, from the peripheral device, fingerprint information of a user, the fingerprint information being acquired by detecting a touch input on a display of the peripheral device,
perform a user authentication by determining whether the received fingerprint information is equivalent to stored fingerprint information of the user, and
when the received fingerprint information is equivalent to the stored fingerprint information, transmit, to the peripheral device, information comprising a second polarity and a second strength for the peripheral device,
wherein the information instructs the peripheral device to generate a second magnetic force according to the second polarity and the second strength, and
wherein the second polarity is determined based on the first polarity for the electronic device and the detected event.

4. The electronic device of claim 1, further comprising:
a connection terminal configured to be physically connected to the peripheral device when the attachment is performed; and
a display,
wherein the at least one processor is further configured to:
detect a swipe input on the display of the electronic device, the swipe input having a direction from the electronic device to the peripheral device, and
transmit at least one content to the peripheral device via the connection terminal, according to the swipe input.

5. The electronic device of claim 1, further comprising:
a connection terminal configured to be physically connected to the peripheral device when the attachment is performed; and
a display,
wherein the at least one processor is further configured to:
display a residual power amount of the electronic device on the display,
detect a swipe input on the display of the electronic device, the swipe input having a direction from the electronic device to the peripheral device, and
provide a charging power to the peripheral device based on the residual power amount of the electronic device and a residual power amount of the peripheral device.

6. The electronic device of claim 1, further comprising:
a display,
wherein the at least one processor is further configured to:
execute at least one application which is resided in the electronic device,
identify at least one operation of the at least one application based on state information and a type of a touch, and
perform the identified at least one operation for the at least one application,
wherein the state information comprises one of the attachment and the detachment between the peripheral device and the electronic device, and
wherein the type of the touch comprises one of a first touch by a finger and a second touch by the peripheral device.

7. The electronic device of claim 1, wherein the at least one processor is further configured to:
receive a message regarding a first application which is resided on the electronic device,
determine whether the peripheral device is attached to the electronic device,
when the peripheral device is attached to the electronic device, generate an alarm for the received message, and
when the peripheral device is detached from the electronic device, transmit, to the peripheral device, the received message.

8. A method of an electronic device, the method comprising:
receiving, from a peripheral device, a request signal for controlling a polarity and a strength of a magnetic force of a first electromagnet whose polarity and strength of magnetic force are controllable, the request signal comprising information on a first magnetic force having a first polarity and a first strength;
controlling a first electromagnet to generate the first magnetic force according to the first polarity and the first strength of the information; and
transmitting, to the peripheral device, a detection signal to detect an attachment or a detachment between the electronic device and the peripheral device, caused by the generated first magnetic force according to the first polarity and the first strength of the information.

9. The method of claim 8, further comprising:
detecting an event for the attachment or the detachment between the electronic device and the peripheral device;
according to the event, determining a second strength and a second polarity of a second magnetic force for the peripheral device; and
transmitting the determined second strength and the determined second polarity of the second magnetic force for the peripheral device.

10. The method of claim 8, further comprising:
detecting an event for the attachment or the detachment between the electronic device and the peripheral device;
receiving, from the peripheral device, fingerprint information of a user, the fingerprint information being acquired by detecting a touch input on a display of the peripheral device;
performing a user authentication by determining whether the received fingerprint information is equivalent to stored fingerprint information of the user; and
when the received fingerprint information is equivalent to the stored fingerprint information, transmitting, to the peripheral device, information comprising a second polarity and a second strength for the peripheral device,
wherein the information instructs the peripheral device to generate a second magnetic force according to the second polarity and the second strength, and
wherein the second polarity is determined based on the first polarity of the electronic device and the detected event.

11. The method of claim 8, further comprising:
detecting a swipe input on a display of the electronic device, the swipe input having a direction from the electronic device to the peripheral device; and
transmitting at least one content to the peripheral device via a connection terminal according to the swipe input,
wherein the connection terminal is configured to be physically connected to the peripheral device when the attachment is performed.

12. The method of claim 8, further comprising:
displaying a residual power amount of the electronic device on a display;
detecting a swipe input on the display of the electronic device, the swipe input having a direction from the electronic device to the peripheral device; and
providing a charging power to the peripheral device based on the residual power amount of the electronic device and a residual power amount of the peripheral device.

13. The method of claim 8, further comprising:
executing at least one application which is resided in the electronic device;
identifying at least one operation of the at least one application based on state information and a type of a touch; and
performing the identified at least one operation for the at least one application,
wherein the state information comprises one of the attachment and the detachment between the peripheral device and the electronic device, and
wherein the type of the touch comprises one of a first touch by a finger and a second touch by the peripheral device.

14. The method of claim 8, further comprising:
receiving a message regarding a first application which is resided on the electronic device;
determining whether the peripheral device is attached to the electronic device;
when the peripheral device is attached to the electronic device, generate an alarm for the received message; and
when the peripheral device is detached from the electronic device, transmit, to the peripheral device, the received message.

15. A peripheral device comprising:
a first electromagnet whose polarity and strength of magnetic force are controllable, and which is mounted to a side surface of the peripheral device;
a transceiver; and
at least one processor configured to:
transmit, to an electronic device, a request signal for controlling a polarity and a strength of a magnetic force of a second electromagnet whose polarity and strength of magnetic force are controllable, and which is mounted to a side surface of the electronic device, the request signal comprising information on a first magnetic force having a first polarity and a first strength,
control the first electromagnet to generate a second magnetic force of the peripheral device, the second magnetic force having an opposite polarity to the first polarity of the information, and
receive, from the electronic device, a detection signal in response to the request signal, the detection signal indicating an attachment or a detachment between the electronic device and the peripheral device, caused by the generated second magnetic force having the opposite polarity to the first polarity of the information.

16. The peripheral device of claim 15, wherein the at least one processor is further configured to:
detect an event for the attachment or the detachment between the electronic device and the peripheral device,
according to the event, display a user interface (UI) on a display of the peripheral device,
transmit, to the electronic device, fingerprint information of a user, the fingerprint information being acquired by detecting a touch input on the display of the peripheral device, and
receive, from the electronic device, information comprising a second polarity and a second strength for the peripheral device,
wherein the information instructs the peripheral device to generate the second magnetic force according to the second polarity and the second strength, and
wherein the second polarity is determined based on the first polarity of the electronic device and the detected event.

17. The peripheral device of claim 15, further comprising:
a connection terminal configured to be physically connected to the electronic device when the attachment is performed; and
a display,
wherein the at least one processor is further configured to:

detect an event requesting a transmission of at least one content to the electronic device, and transmit the at least one content via the connection terminal, according to the detected event.

18. The peripheral device of claim 15, further comprising:

a connection terminal configured to be physically connected to the electronic device when the attachment is performed; and a display, wherein the at least one processor is further configured to:

display a residual battery amount of the peripheral device on the display, and receive a charging power from the electronic device based on the residual battery amount of the peripheral device and a residual battery amount of the electronic device, in response to a swipe input, and wherein the swipe input is detected by the electronic device, the swipe input having a direction from the electronic device to the peripheral device.

19. The peripheral device of claim 15, wherein the at least one processor is further configured to:

receive, from the electronic device, an identifier of an application, identify state information of the peripheral device, when the identified state information comprises the attachment, perform a first operation for the application, the first operation being related to the attachment, and when the identified state information comprises the detachment, perform a second operation for the application, the second operation being related to the detachment, wherein the first operation and the second operation are determined based on the state information and a type of a touch, wherein the state information comprises one of the attachment and the detachment between the peripheral device and the electronic device, and wherein the type of the touch comprises one of a first touch by a finger and a second touch by the peripheral device.

20. The peripheral device of claim 15, wherein the at least one processor is further configured to:

receive, from the electronic device, a message comprising information related to an application, generate a notification for the received message, detect an event for replying to the message, recognize a handwriting input of the peripheral device, based on at least one sensor, and transmit, to the electronic device, the recognized handwriting input.

* * * * *